United States Patent
Hayakawa

(10) Patent No.: US 10,321,210 B2
(45) Date of Patent: Jun. 11, 2019

(54) SENSOR SYSTEM AND METHOD OF COLLECTING DATA

(71) Applicant: Hitachi, Ltd., Tokyo (JP)

(72) Inventor: Miki Hayakawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/757,979

(22) PCT Filed: Jul. 19, 2016

(86) PCT No.: PCT/JP2016/071113
§ 371 (c)(1),
(2) Date: Mar. 7, 2018

(87) PCT Pub. No.: WO2018/015990
PCT Pub. Date: Jan. 25, 2018

(65) Prior Publication Data
US 2018/0242058 A1   Aug. 23, 2018

(51) Int. Cl.
*H04Q 9/00* (2006.01)
*H04Q 9/02* (2006.01)
*G06Q 10/06* (2012.01)

(52) U.S. Cl.
CPC ......... *H04Q 9/02* (2013.01); *G06Q 10/06398* (2013.01); *H04Q 9/00* (2013.01); *H04Q 2209/40* (2013.01); *H04Q 2209/826* (2013.01); *H04Q 2209/84* (2013.01); *H04Q 2209/88* (2013.01)

(58) Field of Classification Search
CPC ......... G06F 17/40; G06F 15/00; G08C 17/02; G08C 19/00

USPC ......... 340/870.02–870.03; 702/187
See application file for complete search history.

(56) References Cited

U.S. PATENT DOCUMENTS

| 5,301,122 A | * | 4/1994 | Halpern | ............... | G01R 21/133 |
| | | | | | 324/113 |
| 2012/0290266 A1 | * | 11/2012 | Jain | ......... | G16H 40/63 |
| | | | | | 702/187 |

(Continued)

FOREIGN PATENT DOCUMENTS

JP   2012-199726 A   10/2012

OTHER PUBLICATIONS

International Search Report of PCT/JP2016/071113 dated Aug. 23, 2016.

*Primary Examiner* — Albert K Wong
(74) *Attorney, Agent, or Firm* — Mattingly & Malur, PC

(57) ABSTRACT

Provided is a sensor system provided with: a terminal apparatus that has a sensor; and a base station that communicates with the terminal apparatus. The terminal apparatus stores acquisition frequency of a measurement data set to be transmitted to the base station, in measurement data sets of the sensor, and transmits first data that includes a reference time of an acquisition period of the measurement data sets of the sensor and the acquisition frequency, and second data that corresponds to the first data and that includes multiple measurement data sets, of the sensor, which have been acquired at the acquisition frequency in the acquisition period. The base station identifies the acquisition time of each of the measurement data sets included in the second data corresponding to the first data, on the basis of the reference time and the acquisition frequency included in the first data.

6 Claims, 17 Drawing Sheets

(56) References Cited

U.S. PATENT DOCUMENTS

2014/0292533 A1\* 10/2014 Kamel ................ H02J 13/0006
　　　　　　　　　　　　　　　　　　　　340/870.02
2015/0116127 A1\* 4/2015 Lynch ............... H04W 52/0229
　　　　　　　　　　　　　　　　　　　　340/870.02

\* cited by examiner

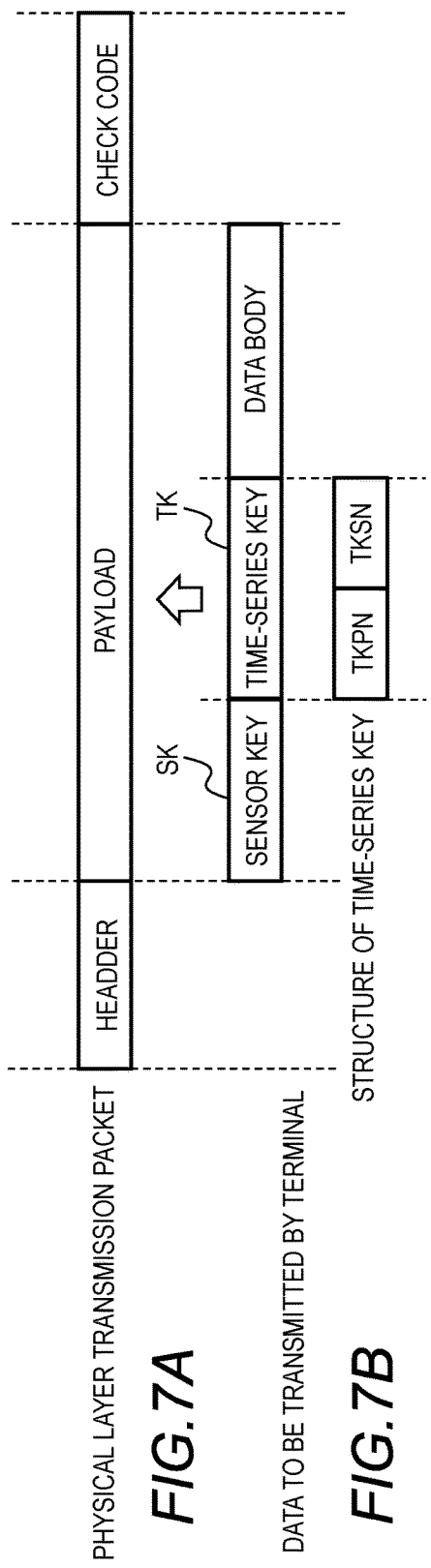

| FIELD NAME | | SIZE (NUMBER OF BYTES) | DESCRIPTION |
|---|---|---|---|
| SENSOR KEY (SK) | | 1 | CODE REPRESENTING STORED PARAMETER TYPE OR SENSOR TYPE |
| TIME-SERIES KEY (TK) | PACKET NUMBER (TKPN) | 1 | UNIQUE VALUE REPRESENTING ORDER OF DATA PACKETS FOR RELEVANT SENSOR TYPE TO BE TRANSMITTED TO RELEVANT SLOT |
| | SENSING SEQUENCE NUMBER (TKSN) | 2 | UNIQUE VALUE CORRESPONDING TO TIME OF SLOT ACQUIRING RELEVANT SENSOR DATA |
| SENSOR DATA (SD) | | 16 | ACTUAL PARAMETER OR ACTUAL DATA MEASURED BY SENSOR |
| TOTAL | | 20 | |

FIG.8

| KEY VALUE DEFINITION OF SECOND DATA GROUP | |
|---|---|
| SENSOR KEY VALUE (SENSOR TYPE) | DEFINITION |
| 0x90 | ACCELERATION X AXIS |
| 0x91 | ACCELERATION Y AXIS |
| 0x92 | ACCELERATION Z AXIS |
| 0x93 | GYRO X AXIS |
| 0x94 | GYRO Y AXIS |
| 0x95 | GYRO Z AXIS |
| 0x96-0x97 | RESERVATION |
| 0x98 | SPEECH ENERGY |
| 0x99 | SPEECH FREQUENCY |
| 0x9A | SPEECH PEAK |
| 0x9B | RESERVATION |
| 0x9C | INFRARED PROXIMITY |
| 0x9D | WIRELESS PROXIMITY |
| 0x9E-0x9F | RESERVATION |

*FIG.9B*

| KEY VALUE DEFINITION OF FIRST DATA GROUP | |
|---|---|
| SENSOR KEY VALUE (PARAMETER) | DEFINITION |
| 0x80 | TERMINAL ID/TIME INFORMATION |
| 0x81 | STATUS/TEMPERATURE, HUMIDITY |
| 0x82 | DATA ACQUISITION FREQUENCY |
| 0x83 | OTHER PARAMETER |
| 0x84-0x8F | RESERVATION |

*FIG.9A*

| DATA ACQUISITION FREQUENCY SELECTION | PARAMETER NAME | SIZE (NUMBER OF BYTES) | MEANING |
|---|---|---|---|
| TEMPERATURE/HUMIDITY/ILLUMINANCE DATA TRANSMISSION INTERVAL | Temp radio data interval | 1 | SET FREQUENCY FOR TRANSMISSION<br>0x00 ... DO NOT TRANSMIT<br>IN OTHER CASES ... TRANSMIT ONCE PER n TIMES<br>EXAMPLE: 0x01 ... TRANSMIT EVERY TIME<br>(ONCE PER 10 SECONDS)<br>0x02 ... TRANSMIT ONCE PER 2 TIMES<br>(ONCE PER 20 SECONDS) |
| Acc X DATA TRANSMISSION INTERVAL | AccX radio data interval | 1 | SET INTERVAL FOR THINNING SENSOR DATA |
| Acc Y DATA TRANSMISSION INTERVAL | AccY radio data interval | 1 | 0x00 ... DO NOT TRANSMIT ANY |
| Acc Z DATA TRANSMISSION INTERVAL | AccZ radio data interval | 1 | HIGHER-LEVEL DIGIT n: THIN DATA BY 1/n AND TRANSMIT |
| GYRO X DATA TRANSMISSION INTERVAL | GyroX radio data interval | 1 | LOWER-LEVEL DIGIT m: OF DATA THINNED BY 1/n, TRANSMIT m-th PIECE OF DATA |
| GYRO Y DATA TRANSMISSION INTERVAL | GyroY radio data interval | 1 | EXAMPLE: 0x1* ... TRANSMITS ALL DATA (* IS "DON'T CARE") |
| GYRO Z DATA TRANSMISSION INTERVAL | GyroZ radio data interval | 1 | 0x20 ... THIN BY 1/2 AND TRANSMIT FIRST PIECE OF DATA |
| SPEECH ENERGY DATA TRANSMISSION INTERVAL | VEn radio data interval | 1 | 0x32 ... THIN BY 1/3 AND TRANSMIT SECOND PIECE OF DATA |
| SPEECH FREQUENCY DATA TRANSMISSION INTERVAL | VFq radio data interval | 1 | |
| INFRARED PROXIMITY DETECTION DATA TRANSMISSION INTERVAL | IR radio data interval | 1 | OF INFRARED DETECTION DATA OF RELEVANT SLOT, SET MAXIMUM NUMBER OF RECORDS TO BE TRANSMITTED<br>0x00 ... DO NOT TRANSMIT<br>IN OTHER CASES ... SET NUMBER OF RECORDS TO BE TRANSMITTED<br>EXAMPLE: 0x01 ... MAXIMUM OF ONE RECORD IN 10 SECONDS<br>0x02 ... MAXIMUM OF TWO RECORDS IN 10 SECONDS |
| WIRELESS PROXIMITY DETECTION DATA TRANSMISSION INTERVAL | RProx radio data interval | 1 | |

*FIG.10*

SENSOR SYSTEM AND METHOD OF COLLECTING DATA

BACKGROUND OF THE INVENTION

This invention relates to a system configured to collect data measured by a sensor terminal, analyze the collected data, and provide the analysis result as feedback.

In place of the organization evaluation based on an individualistic and qualitative assessment as hitherto performed, there have been developed technologies for visualizing human behavior and communication in an organization by using sensor technology, and objectively evaluating the quality of a business process. The sensors used in this technology include an infrared communicator for detecting face-to-face communication, a three-axis acceleration sensor for measuring the movement of the body, a microphone for measuring the characteristics of speech uttered by a wearer, and a plurality of types of sensors for measuring a surrounding situation, such as a temperature sensor and an illuminance sensor. In order to simultaneously measure a large number of people not only in individual units but also in organization units, it is required to collect data from a large number of sensor terminals.

In such a system, in general, the sensor terminal includes a communicator, and data is collected by communication to/from a base station apparatus including means for communicating to/from the sensor terminal.

In JP 2012-199726 A, there is disclosed a sensor system for large-scale collection of measurement data by a server apparatus. In the sensor system, a communicator is mounted to a meter for measuring the power consumption of a home or a factory by a sensor. In the disclosed sensor system, "a difference between the previously-notified amount of change in a meter reading value and an amount of change in the meter reading value calculated from the previous meter reading value and the current meter reading value is calculated, and when the calculated difference exceeds a predetermined threshold, meter reading data corresponding to the meter reading value is stored in a transmission buffer, and is then transmitted".

SUMMARY OF THE INVENTION

In JP 2012-199726 A, the power consumption data measured by the meter is not only used to calculate a monthly electricity usage billing amount, but is also used to grasp a current demand to allow the operating state of power stations and substations to be adapted to demand fluctuations, and hence the meter periodically transmits the data to a server apparatus. However, when there are a very large number of meters on a network and the communicators of all the meters communicate all at once, the communication band of the network can become tight, causing congestion and rendering communication impossible, or the server load can increase, causing a substantial deterioration in the communication efficiency. In the invention disclosed in JP 2012-199726 A, congestion and an increase in the server load are prevented by calculating the difference in power consumption per unit time measured on the meter, and transmitting the data only when the difference exceeds a threshold set in advance.

In this way, in the technology disclosed in JP 2012-199726 A, the meter itself determines the sensor value per unit time (power consumption), and the total communication data amount is suppressed by preferentially transmitting only data equal to or more than the threshold. Meanwhile, in order to analyze the communication in the organization, a human behavior sensor not only always accumulates sensor data acquired from a single sensor terminal, but also temporarily accumulates, on the server, data acquired from a plurality of sensor terminals, and derives an analysis result by using information on a relationship among the plurality of sensors. The data to be prioritized depends on the analysis purpose and the analysis result, and hence it is not possible to unilaterally determine on the terminal side whether data can be transmitted or received. Further, the information acquired by the meter is basically a single type of data, for example, power consumption, and a plurality of types of sensor data are not handled on one terminal. The measurement data obtained by the meter is for the purpose of acquiring the current consumption amount. Information on the time-series continuity and the order relationship is not added to that data.

It is an object of this invention to provide a measure for controlling an amount of transmitted data in a system in which a plurality of sensor terminals each including a plurality of types of sensors transmit data to a base station.

According to a representative example of this invention disclosed in this application, there is provided a sensor system, comprising: a terminal apparatus comprising a sensor; and a base station configured to communicate to/from the terminal apparatus, the terminal apparatus being configured to: store, of measurement data acquired by the sensor, an acquisition frequency for the measurement data to be transmitted to the base station; and transmit first data including the acquisition frequency and a reference time of an acquisition period in which the measurement data is acquired by the sensor, and second data corresponding to the first data and including a plurality of pieces of measurement data acquired by the sensor at the acquisition frequency during the acquisition period, the base station being configured to identify, based on the reference time and the acquisition frequency included in the first data, an acquisition time of each of the plurality of pieces of measurement data included in the second data corresponding to the first data.

According to one embodiment of this invention, through transmission of communication packets by dividing the packets into communication packets storing a first data group including time information, a sensor data acquisition frequency, and the like, and communication packets storing a second data group including the actual data measured by the sensors, the amount of data per communication packet can be reduced, and communication efficiency can be improved, and as a result, congestion on the communication path can be prevented. Problems, configurations, and effects other than those described above are made clear based on the following description of an embodiment of this invention.

BRIEF DESCRIPTION OF THE DRAWINGS

FIG. 7A and FIG. 7B are explanatory diagrams of the data to be transmitted and received by the sensor system according to the embodiment of this invention.

FIG. 8 is an explanatory diagram of a specific example of the structure and the size of a packet to be transmitted by the sensor terminal in the embodiment of this invention.

FIG. 9A and 9B are tables for showing an example of a sensor type key of the packets of the first data group and the second data group transmitted by the sensor terminal in the embodiment of this invention.

FIG. 10 is a table for showing an actual example of a data acquisition frequency parameter included in the first data group in the embodiment of this invention.

DETAILED DESCRIPTION OF THE PREFERRED EMBODIMENTS

An embodiment of this invention is now described with reference to the drawings.

In order to clarify the concept and functions of this invention, first, a sensor system according to one embodiment of this invention is described. The sensor system according to one embodiment of the invention is a system to be used in order to help improve an organization by combining the behavior and surrounding situation of people wearing a nameplate-type sensor terminal acquired by the nameplate-type sensor terminal with face-to-face information of the wearers, and analyzing and illustrating, as organization activities, wearer's behavior, relations between the wearers, and a current organization evaluation (performance).

Another purpose of the sensor system is to improve work efficiency in a work field in which person-to-person communication in an organization, such as an on-site shop or medical facility, is strongly related with performance, by visualizing and analyzing flow lines and communication among staff members and flow lines and communication between staff and customers or patients.

Figure 1:
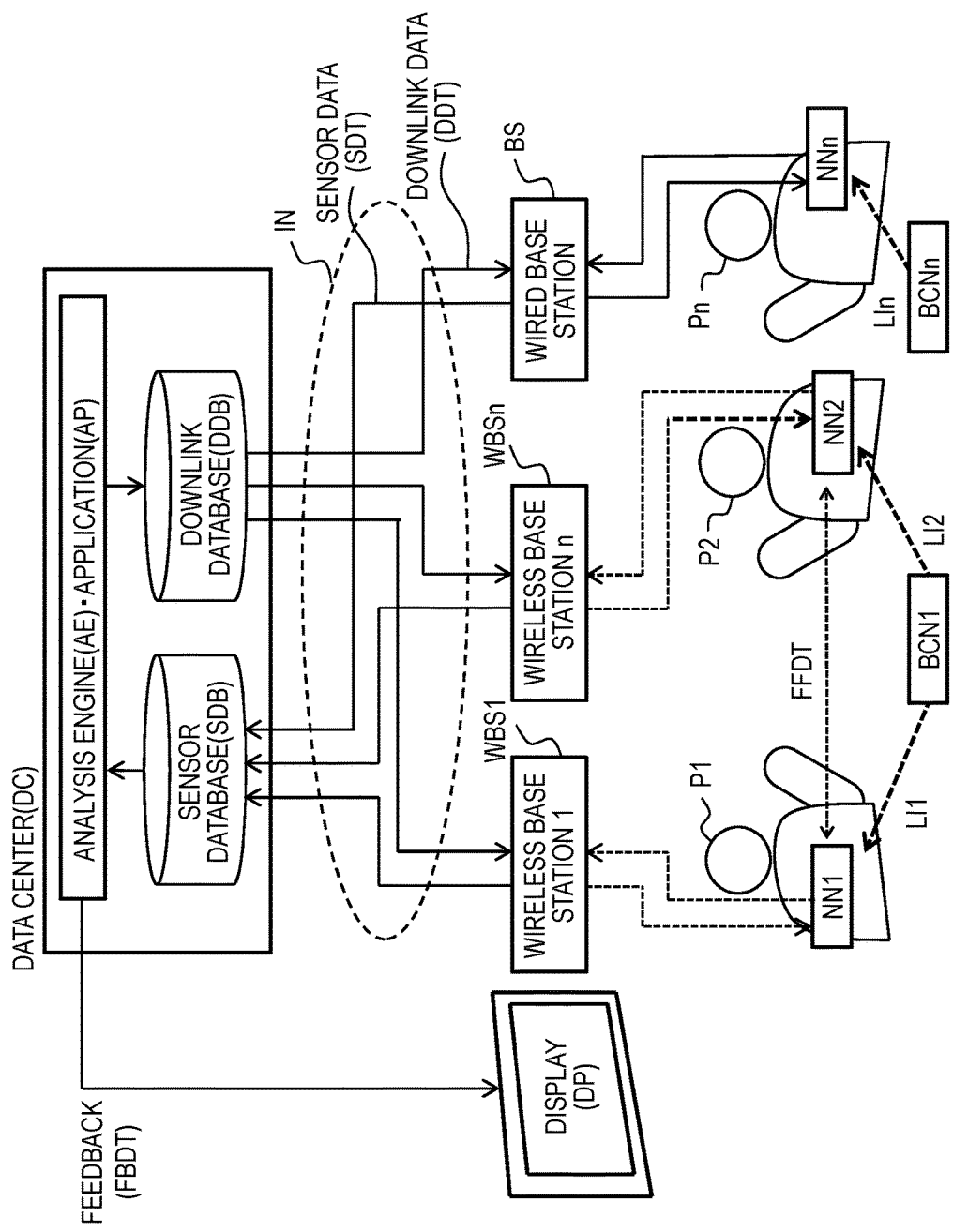
FIG. 1 is an explanatory diagram for illustrating a representative system configuration of a sensor system according to an embodiment of this invention.

FIG. 1 is an explanatory diagram for illustrating a representative system configuration of the sensor system according to an embodiment of this invention.

A feature of this sensor system resides in that persons (P1, P2, Pn) are each wearing a nameplate-type sensor terminal NN (NN1, NN2, NNn). In general, a plurality of persons, that is, two or more persons are wearing the nameplate-type sensor terminal NN. At the nameplate-type sensor terminal NN, data representing a face-to-face interaction between people, behavior, an environment in which the sensor terminal is placed, and the like is acquired and accumulated by a sensor, and the data is collected via a base station.

There are various types of base stations. For example, the base station may be a base station WBS (WBS1, WBSn) for performing wireless communication to/from the sensor terminals or a base station BS (BS) for performing wired communication to/from the sensor terminals. The sensor system can be built from only wireless base stations WBS, built from only wired base stations BS, or as illustrated in FIG. 1, built from a mixture of wireless base stations WBS and wires base stations BS. In the following description, when the description is the same for the wired base stations BS and the wireless base stations WBS, the base stations are sometimes collectively referred to as "base stations (BS/WBS)".

The nameplate type sensor terminal NN has a function for recording the fact that that the sensor terminal has approached another sensor terminal. This is called a proximity detection function. In this embodiment, it is assumed that there are two types of proximity detection function, namely, a proximity detection function using infrared signals and a proximity detection function using wireless signals. The proximity detection function has two roles. One role is to detect face-to-face communication between wearers. The other role is to receive signals from stationary transmitters BCN (BCN1, BCNn) installed at various locations to check when and where each wearer is.

Location information transmitted by each transmitter BCN may be transmitted by using infrared communication or by using wireless communication. Compared with wireless communication, infrared communication is more direct and is less susceptible to dispersion and reflection, and hence is suitable for detecting that terminals are facing each other. Meanwhile, wireless communication tends to diffuse and radiate through wider spaces than infrared rays, and hence is suitable for detecting that a particular terminal is present in a wider space.

The data collected by the wired base stations (BS) or the wireless base stations (WBS) is stored as sensor data (SDT) in a sensor database (DSB) via a line, for example, the Internet (IN). The sensor data may be analyzed by an analysis engine (AE) and displayed as feedback data (FBDT) by an application (AP) on a display (DP), or may be stored in a downlink database (DDB), then again transferred to the base stations (BS/WBS) via the Internet, and displayed on a screen of the sensor terminal NN, or notified directly to the wearer as a speech message.

Figure 2:
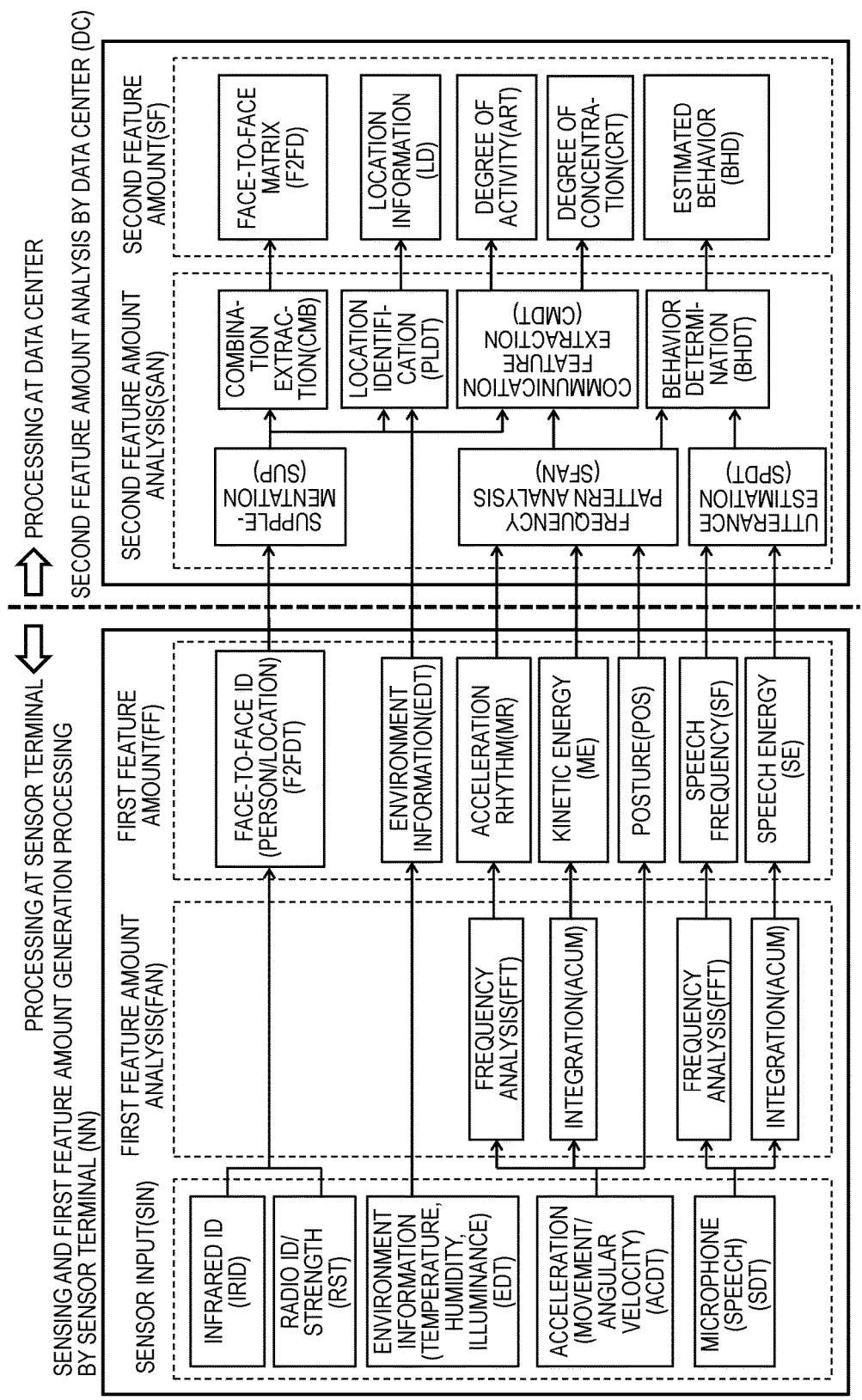
FIG. 2 is an explanatory diagram for illustrating an example of a flow of analysis of the data collected by a sensor terminal in the embodiment of this invention.

FIG. 2 is an explanatory diagram for illustrating an example of a flow of analysis of the data collected by a sensor terminal in the embodiment of this invention.

A sensor input (SIN) acquired by a sensor mounted to the sensor terminal NN includes an infrared ID (IRID), a radio ID/strength (RST), environment information (EDT) on the temperature, humidity, illuminance, and the like, an acceleration/angular velocity (ACDT), and speech (SDT) acquired from a microphone.

The dynamic acceleration/angular velocity (ACDT) is subjected to frequency analysis (FFT) and integration (ACUM) by a first feature amount analysis module (FAN) in the sensor terminal NN, and an acceleration rhythm (MR) and a kinetic energy (ME), which are first feature amounts (FF), are generated and recorded. Static acceleration information is recorded as posture information (POS), which is a first feature amount (FF).

Similarly, the speech (SDT) obtained from the microphone is subjected to frequency analysis (FFT) and integration (ACUM), and a first feature amount speech frequency (SF) and a first feature amount speech energy (SE), which are first feature amounts (FF), are generated and recorded.

The infrared ID (IRID) is obtained by the sensor terminal NN receiving an ID issued by another sensor terminal and a stationary infrared beacon. The infrared ID (IRID) is recorded as a first feature amount of the face-to-face ID (person/location). The radio ID/strength (RST) is information obtained by the sensor terminal NN receiving the ID issued by another terminal and a stationary radio beacon and measuring information on the strength of the received ID. Similarly to the infrared ID (IRID), the radio ID/strength (RST) is recorded as a first feature amount F2FDT of the face-to-face ID (person/location). Environment information (EDT) is also recorded as a first feature amount (FF).

The first feature amounts (FF) including the various above-mentioned first feature amounts recorded in the sensor terminal are transferred to a data center (DC) via a base station (described later, not shown in FIG. 2), and subjected to second feature amount analysis (SAN) to generate second feature amounts (SF).

For the face-to-face ID (F2FDT), supplementation processing (SUP) and combination extraction (CMB) are performed as second feature amount analysis (SAN) to generate a face-to-face matrix (F2FD) as a second feature amount (SF). The supplemented face-to-face ID is compared with the environment information (EDT) by location identification (PLDT), and location information (LD) is generated as a second feature amount (SF). The acceleration rhythm (MR), the kinetic energy (ME), and the posture (POS) are subjected to frequency pattern analysis (SFAN), and combined with the supplemented face-to-face ID information to generate a degree of activity (ART), a degree of concentration (CRT), and the like by communication feature extraction (CMDT) as second feature amounts (SF) relating to communication by the wearer of the sensor terminal. For the speech frequency (SF) and the speech energy (SE), an utterance by the wearer is determined by utterance estimation (SPDT), and together with analysis information on an acceleration frequency pattern, an estimated behavior (BHD) of the person wearing the sensor terminal is generated as a second feature amount (SF) by a behavior determination module (BHDT).

<Description of Base Station Operation>

Next, operation of the base station is described with reference to FIG. 3 and FIG. 4 for illustrating a flow of sensor data (SDT), feedback data (FBDT), and transmission frequency setting information (FBSID). The sensor data (SDT) is collected from the sensor terminal (NN) by the base station (BS/WBS), and stored in the sensor database (DSB) of the data center (DC). Meanwhile, for the feedback data (FBDT) and the transmission frequency setting information (FBSID), information stored in the downlink database (DDB) of the data center (DC) by a higher-level application (not shown) is transmitted to the sensor terminal (NN) via the base station (BS/WBS). The flow direction of the sensor data (SDT) is opposite from the flow direction of the feedback data (FBDT) and the transmission frequency setting information (FBSID). Therefore, the sensor data (SDT) is described with reference to FIG. 3, and the feedback data (FBDT) and the transmission frequency setting information (FBSID) are described with reference to FIG. 4. It should be understood that one base station can implement both the function for collecting the sensor data and the function for distributing the feedback data.

Figure 3:
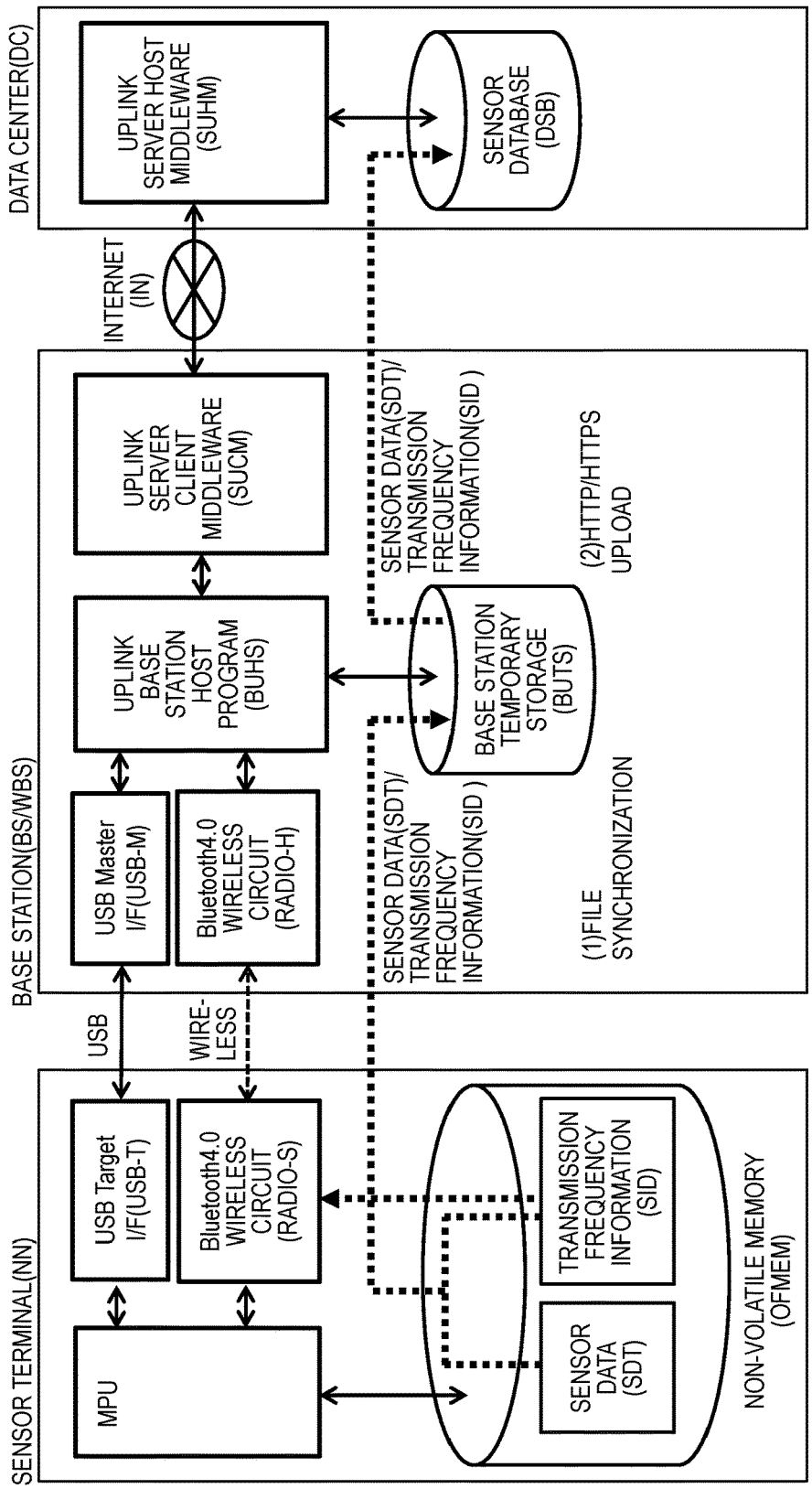
FIG. 3 is an explanatory diagram for illustrating a flow of sensor data collection in the sensor system of the embodiment of this invention.

FIG. 3 is an explanatory diagram for illustrating a flow of sensor data collection in the sensor system of the embodiment of this invention.

The sensor data stored in a non-volatile memory (OFMEM) of the sensor terminal (NN) is transferred to the base station via a wireless circuit (RADIO-S) or a universal serial bus (USB) target interface (I/F) (USB-T). The data is transmitted via a wired communicator (USB-T) represented by USB and the like, or a wireless communicator (RADIO-S) represented by Bluetooth and the like. At this time, the granularity and frequency for transmitting the measured sensor data is controlled based on transmission frequency information (SID) stored in the non-volatile memory (OFMEM). The data to be transmitted includes two types of data, namely, a first data group in which parameters such as time information (not shown) and the transmission frequency information (SID) are stored, and a second data group including sensor data (SDT) measured by the sensors. The first data group is not necessarily transmitted at the same frequency as that of the second data group.

An uplink base station host program (BUHS) of the base station receives the sensor data (SDT) and the transmission frequency information (SID) transmitted from the sensor terminal via a wireless circuit (RADIO-H) or USB master I/F (USM-M), and temporarily stores the received data and information in a base station temporary storage (BUTS). The reason for storing the sensor data (SDT) and the transmission frequency information (SID) in the temporary storage (BUTS) is to prevent the loss of sensor data due to the fact that the base station receives a large amount of sensor data (SDT) from many sensor terminals, which means that storage in the sensor database (DSB) of the data center (DC) may not keep up when the transfers are concentrated.

The base station (BS/WBS) uses an uplink server client middleware (SUCM) to extract the sensor data (SDT) and transmission frequency information (SID) temporarily accumulated in the temporary storage (BUTS), and transmits the extracted data and information to the data center (DC) via the Internet (IN).

Figure 4:
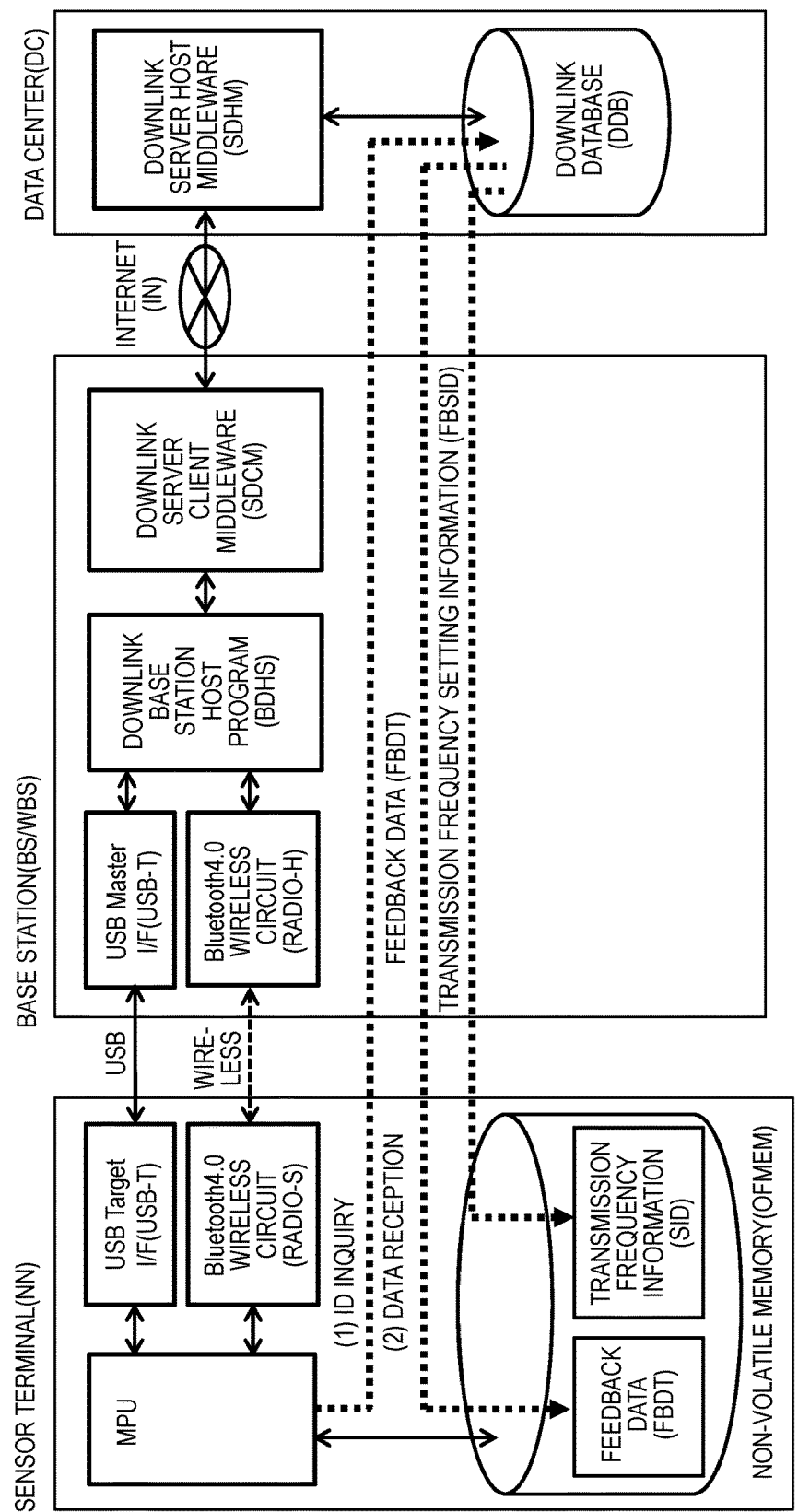
FIG. 4 is an explanatory diagram for illustrating a flow of feedback data distribution in the sensor system of the embodiment of this invention.

FIG. 4 is an explanatory diagram for illustrating a flow of feedback data distribution in the sensor system of the embodiment of this invention.

The sensor terminal (NN) issues to the base station (BS/WBS), via the wireless communicator (RADIO-S) or the wired communicator (USB-T), an inquiry about whether there is feedback data or transmission frequency setting information directed to that sensor terminal (NN). A downlink host program (BDHS) of the base station receives, via the wireless circuit (RADIO-H) or the USB master I/F (USB-M), the inquiry transmitted from the sensor terminal, and transfers the received inquiry to a downlink server host middleware (SDHM) of the data center (DC) via a downlink server client middleware (SDCM).

The downlink server host middleware searches the downlink database (DDB) for whether or not feedback data (FBDT) or transmission frequency setting information (FBSID) for the sensor terminal is registered based on the ID of the sensor terminal that transmitted the inquiry, and when such data or information is registered, transfers the relevant feedback data (FBDT) or transmission frequency setting information (FBSID) to the downlink server client middleware (SDCM). The downlink base station host program (BDHS) transmits the feedback data (FBDT) or the transmission frequency setting information (FBSID) received via the downlink server client middleware (SDCM) to the sensor terminal (NN) via the wireless circuit (RADIO-H) or the USB master I/F (USB-M).

The sensor terminal (NN) receives, via the wireless communicator (RADIO-S) or the wired communicator (USB-T), the feedback data (FBDT) or the transmission frequency setting information (FBSID) transmitted by the downlink base station host program (BDHS), and stores the received data or information in the non-volatile memory (OFMEM).

<Description of Nameplate-type Sensor Terminal>

Figure 5:
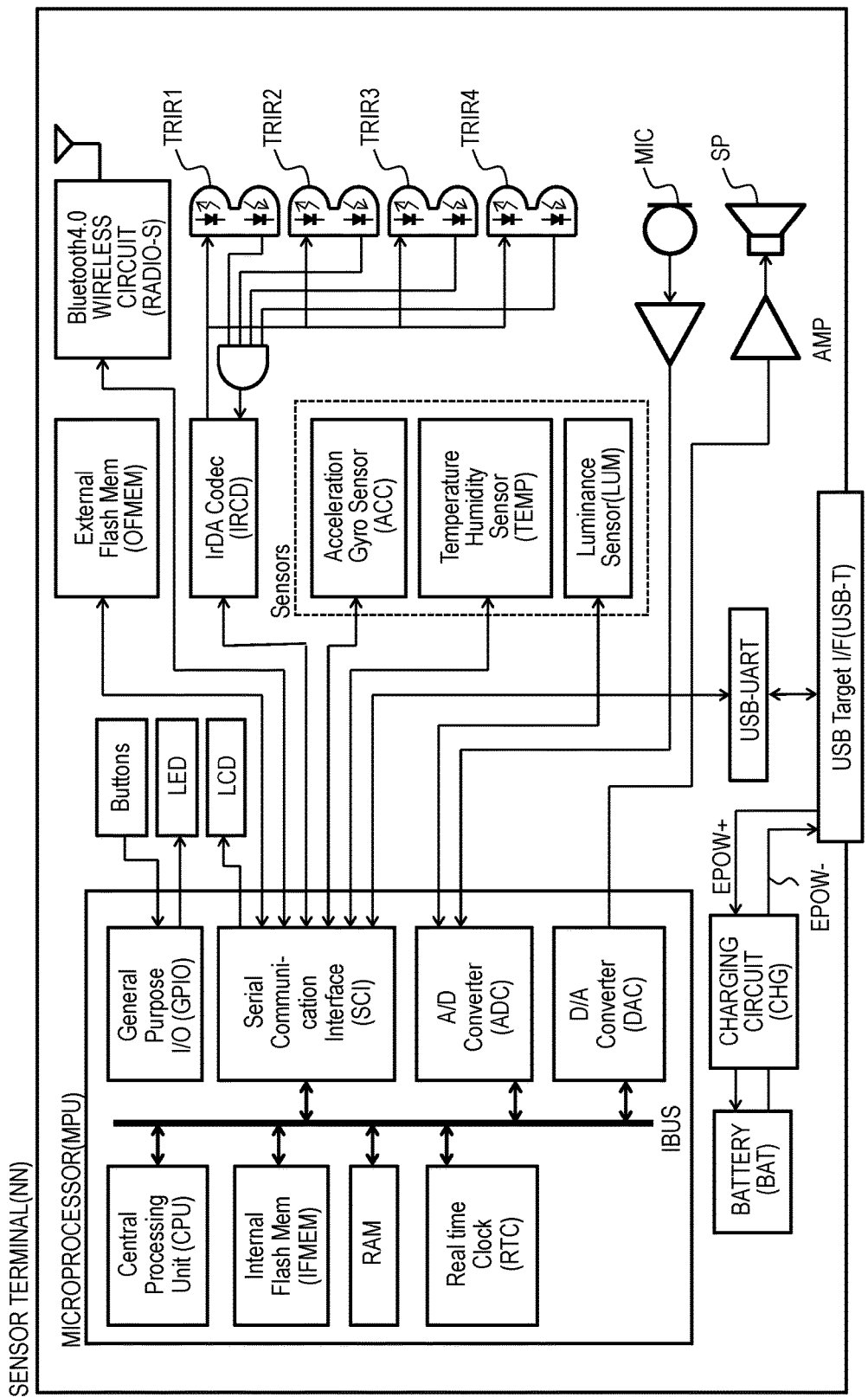
FIG. 5 is an explanatory diagram of a hardware configuration of a nameplate-type sensor terminal in the embodiment of this invention.

FIG. 5 is an explanatory diagram of a hardware configuration of the nameplate-type sensor terminal NN in the embodiment of this invention.

The sensor terminal (NN) includes a microprocessor (MPU) serving as a central device for performing overall control, and various communication circuits. The microprocessor includes a central processing unit (CPU), a non-volatile memory (IFMEM) represented by a flash memory, for example, in which programs and fixed data to be operated by the CPU are stored, a volatile memory (RAM) in which temporary data is stored, a real time clock (RTC) for measuring time, a general-purpose input/output (I/O) (GPIO), a serial communication circuit (SCI), an analog-to-digital (A/D) converter (ADC), and a digital-to-analog (D/A) converter (DAC). Those devices are coupled to each other via a bus (IBUS) in the microprocessor, and are controlled by the CPU.

The nameplate-type sensor terminal NN in this embodiment includes an acceleration/angular velocity sensor (ACC), a temperature/humidity sensor (TEMP), and an illuminance sensor (LUM). The output from the acceleration/angular velocity sensor (ACC) and the output from the temperature/humidity sensor (TEMP) are each output as a digital serial signal, and hence those sensors are coupled to the serial communication circuit (SCI) of the microprocessor. The output from the illuminance sensor (LUM) is an analog output, and hence the illuminance sensor (LUM) is coupled to the A/D converter (ADC) of the microprocessor (MPU), and the output is digitally converted by the microprocessor (MPU). The speech acquired by the microphone (MIC) is also digitally converted by the A/D converter (ADC).

The nameplate-type sensor terminal NN in this embodiment includes four sets of infrared transmission/reception circuits (TRIR1 to TRIR 4), and performs face-to-face detection and location detection by infrared communication. The protocol to be used is, for example, the IrDA standard, and each transmission/reception circuit is coupled to the serial communication circuit (SCI) of the microprocessor (MPU) via an IrDA modulation/demodulation circuit (IRCD).

The sensor data (SDT) acquired from the sensors is stored in an external non-volatile memory (OFMEM) coupled to the serial communication circuit (SCI) of the microprocessor (MPU). In this embodiment, the time measured by the real time clock (RTC) and data acquisition frequency information to be set for each sensor are stored in the external non-volatile memory (OFMEM). Depending on the mode of implementation, the measured time and the data acquisition frequency information may be stored in a built-in non-volatile memory (IFMEM) of the microprocessor (MPU), and not in the external non-volatile memory.

The sensor terminal NN includes the wireless communication circuit (RADIO-S) based on Bluetooth and the USB target interface (USB-T) for transmitting the sensor data (SDT) to a base station (BS/WBS) and for receiving the feedback data (FBDT). Those devices are also coupled to the serial communication circuit (SCI) of the microprocessor (MPU).

The sensor terminal NN operates based on electric power supplied from a secondary battery (BAT). The secondary battery (BAT) is charged by a charging circuit (CHG) using the power supplied by a bus power supply (EPOW+, EPOW−) from the USB target interface (USB-T).

The sensor terminal NN includes, as a user interface, button switches (Buttons), a light-emitting diode (LED), and a liquid crystal screen (LCD). The buttons and the LED are coupled to a general purpose I/O (GPIO) for the LED, and the liquid crystal screen (LCD) is coupled to a serial communication circuit (SCI).

<Description of Data Format>

In general, in a sensor system, in order to collect the data of a plurality of sensor terminals by one base station, multiplex communication is performed in which a plurality of terminals communicate on one communication channel. In many cases, transmission is performed in a time-division manner by delimiting transmission data so that the communication path is not exclusively used by one terminal continuously. The set of data obtained by this delimiting is called a packet.

In this embodiment, a first data group for transmitting parameters such as time information and a data acquisition frequency and a second data group for transmitting the actual data measured by the sensors are each transmitted in the form of packets. The first data group and the second data group are both constructed from one or a plurality of packets.

Figure 6:
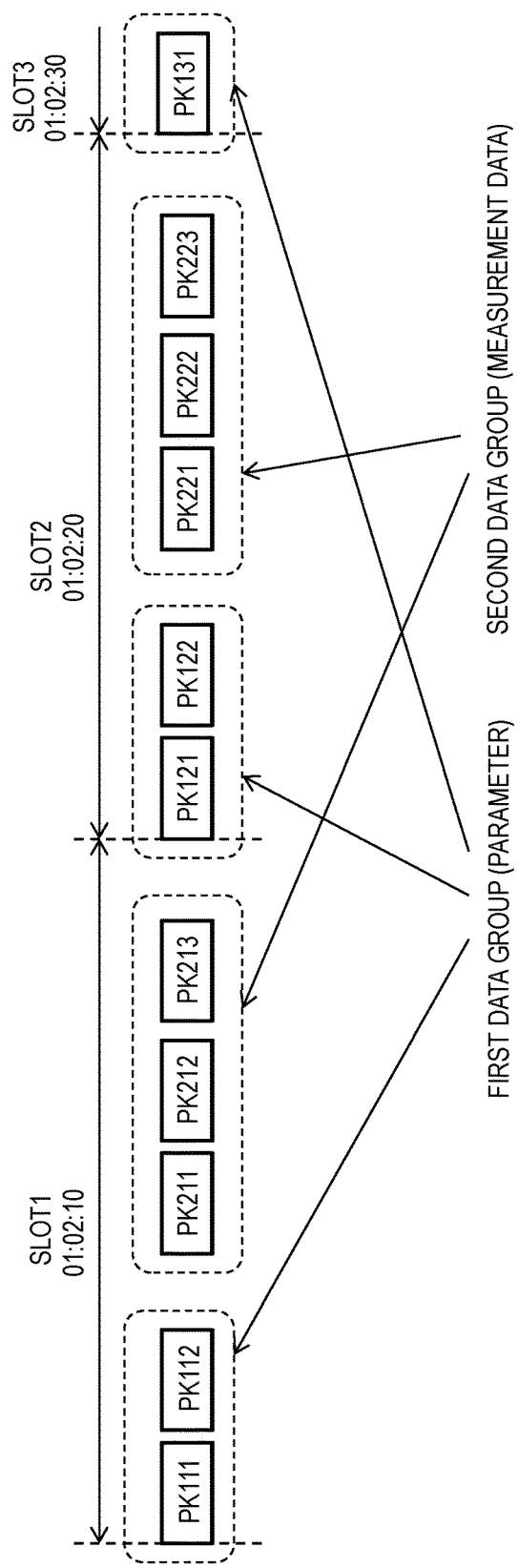
FIG. 6 is an explanatory diagram for illustrating an example in which a first data group and a second data group are transmitted by packet transmission in the sensor system according to the embodiment of this invention.

FIG. 6 is an explanatory diagram for illustrating an example in which the first data group and the second data group are transmitted by packet transmission in the sensor system according to the embodiment of this invention.

In the example of FIG. 6, PK111 to PK131 and PK211 to PK223 represent packets. In FIG. 6, there is illustrated an example in which the first data group is constructed from two packets and the second data group is constructed from three packets. PK111 and PK112 represent a first data group to be transmitted first, and PK211, PK212 and PK213 represent a second data group to be transmitted first. The first data group includes time information, for example, a 10-second amount of data from 01:02:10. Data formed by combining a first data group and a second data group to be transmitted for one piece of time information is defined as a slot. PK121 and PK122 are a first data group to be transmitted second. A second data group (PK221, PK222, PK223) to be transmitted second following the first data group to be transmitted second is transmitted. The time information stored in the first data group is a 10-second amount of data from 01:02:20. In other words, in FIG. 6, one slot contains a 10-second amount of data, and the time information is included in the first data group of each slot.

The time information included in the first data group represents time information on the first data of the sensor measurement data included in that slot, and this time information is referred to as a time stamp. A time stamp is time information on the data measured by the sensor, and does not necessarily mean the time at which the data is transmitted. In applications that immediately transmit data acquired by a sensor using wireless communication, the time stamp and transmission time may be roughly equal to each other.

In FIG. 6, as a simple example, there is illustrated an example in which the first data group is constructed from two packets and the second data group is constructed from three packets, but actually the number of those packets can be further increased. In general, it is desired that the number of packets of the second data group be larger than the number of packets of the first data group. In particular, the second data group does not include time information, and it is not required to increase the number of packets of the first data group in accordance with an increase in the number of packets of the second data group as long as the number of sensors is constant, and hence the ratio of the amount of measurement data from the sensors to the amount of all transmitted data, namely, the measurement data transmission efficiency, is higher when there are more second data group packets in each slot.

FIG. 7A and FIG. 7B are explanatory diagrams of the data to be transmitted and received by the sensor system according to the embodiment of this invention.

FIG. 7A is a diagram for illustrating the physical layer packet structure to be transmitted and received in this embodiment. This packet structure is the same as the physical layer packet structure in general wired/wireless communication. A packet is basically constructed from a header (Header), a payload (Payload), and a check code (Check Code). The header includes, for example, a preamble indicating the beginning of the data, a length indicating the total amount of data of the packet, and a unique ID for identifying the individual packet. Those parts depend on the physical layer protocol of the communication method to be used, and hence are omitted from in FIG. 7A. The payload is the actual data to be transmitted. At the end of the packet, a check code is added to check whether or not the packet has been correctly transmitted and received. In this embodiment, as the data to be stored in the payload, a sensor type key and a time-series key are added to the data body.

FIG. 7B is a diagram for illustrating data transmitted by the sensor terminal in the embodiment of this invention.

The data to be stored in the payload of the packet includes a sensor type key (SK), a time-series key (TK), and a data body. Details of those parts are described later with reference to FIG. 8. A header and a check code are added to the payload by the communication physical layer and transmitted.

FIG. 8 is an explanatory diagram of a specific example of the structure and the size (number of bytes) of a packet to be transmitted by the sensor terminal in the embodiment of this invention.

The sensor type key (SK) represents a parameter type or a sensor type stored in the packet. Basically, the first data group for transmitting the time and data acquisition frequency parameters and the second data group for transmitting actual data measured by the sensors both use packets having the same structure.

The sensor type key (SK) has an information amount for identifying the type of the parameter and the type of the sensor. In the example of FIG. 8, that information amount is represented by one byte. With 1 byte, up to 256 parameter types or sensor types can be identified. A specific example of the sensor type key (SK) is described later.

The sensor terminal (NN) transmits the time-series key (TK) together with the sensor type key (SK). The time-series key (TK) is constructed from a packet number (TKPN) and a sensing sequence number (TKSN). The packet number (TKPN) is transmitted in the slot including that packet, and is a unique value representing the order of the data packets having the sensor type indicated by the sensor type key (SK). A higher-level packet number (TKPN) is assigned to packets storing measurement data acquired earlier. The sensing sequence number (TKSN) is a unique value corresponding to the time of the slot in which the sensor data included in the packet is acquired. The packet number (TKPN) is represented by 1 byte as long as the number of packets storing the data of the sensor type of the slot does not exceed 256. The sensing sequence number (TKSN) is used to identify, when a plurality of packets are included in one slot, that those packets are included in the same slot. When the slot length is 10 seconds, there are 8,640 slots when the sensor terminal (NN) operates continuously for one day. In this embodiment, the sensing sequence number (TKSN) is represented by a two-byte length, and hence uniqueness is guaranteed for 65,536 slots, which corresponds to a data amount of one week or more.

The sensor data (SD) is the actual parameter or the actual data measured by the sensors. In this embodiment, the sum of the size of the sensor type key (SK) and the size of the time-series key (TK) is 4 bytes, which corresponds to a small packet of 20 bytes or less even including 16 bytes of actual data.

FIG. 9A and 9B are tables for showing an example of the sensor type key of the packets of the first data group and the second data group transmitted by the sensor terminal in the embodiment of this invention.

In this embodiment, as shown in FIG. 9A, the sensor type key (SK) of the packets of the first data group storing parameters such as time information and data acquisition frequency is expressed in hexadecimal as a series 0x80. Meanwhile, as shown in FIG. 9B, the sensor type key (SK) of the packets of the second data group storing the actual data measured by the sensors is expressed in hexadecimal as a series 0x90. The prefix 0x indicates that the packet is expressed in hexadecimal. For example, a packet having the sensor type key (SK) 0x80 indicates that a terminal ID and time information are stored, and a packet having the sensor type key (SK) 0x90 indicates that X-axis data of acceleration is stored.

FIG. 10 is a table for showing an actual example of the data acquisition frequency parameter included in the first data group in the embodiment of this invention.

Specifically, in FIG. 10, there is shown a presence/absence of data acquisition and a setting format of a transmission frequency parameter (e.g., thinning parameter) for each of data relating to temperature, humidity, illuminance, three-axis acceleration, three-axis gyro, speech energy, speech frequency, speech frequency, infrared proximity detection, and wireless proximity detection measured on the sensor terminal. When 0x00 is set for a piece of data, that data is not transmitted. Regarding values other than 0x00, a higher-level digit setting value n is set indicating that a piece of data is to be transmitted once every n-times that data is measured, and a lower-level digit setting value m is set indicating, for data measured n-times, which of those pieces of data is to be transmitted. For example, when 0x10 is set, the 0-th data (i.e., that measured data) is transmitted once every time data is measured once. In other words, each time data is measured, that measured data is transmitted every time. When 0x21 is set, the data is thinned based on a ratio of the number of transmissions to the number of measurements of 1:2, and the first of that data (i.e., the second piece of data) is transmitted. For example, in the case of acceleration data measured 50 times per second, odd-numbered data having a sampling rate corresponding to data measured 25 times per second is transmitted.

<Description of Communication Operation>

Figure 11:
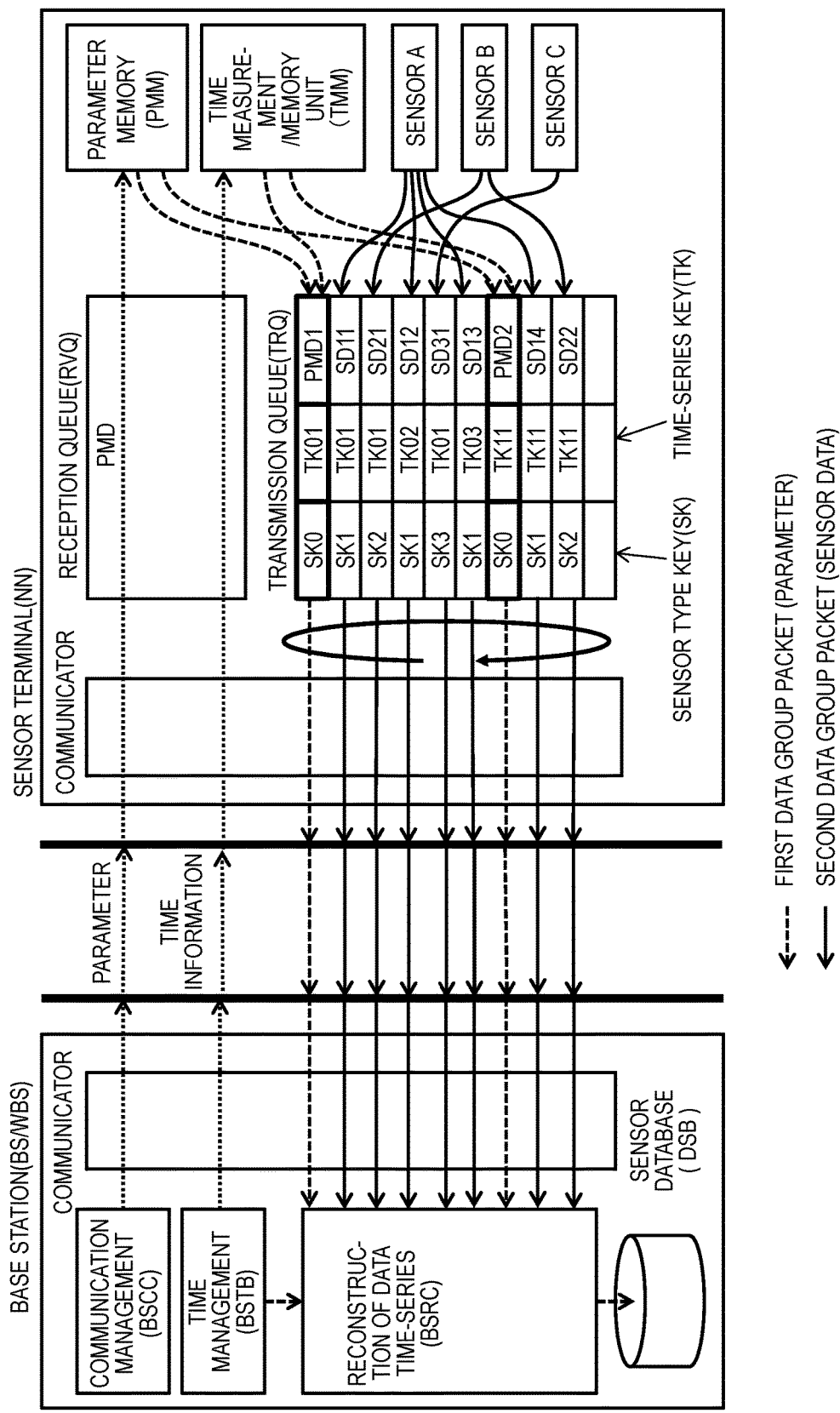
FIG. 11 is an explanatory diagram for illustrating a communication operation between the sensor terminal and a base station in the embodiment of this invention.

FIG. 11 is an explanatory diagram for illustrating a communication operation between the sensor terminal and the base station in the embodiment of this invention.

The base station (BS) and the sensor terminal (NN) have the same communicator, and transmit the sensor data measured by the sensor terminal (NN) to the base station (BS). The sensor terminal (NN) includes a parameter memory (PMM) for storing parameters such as the data acquisition frequency and a time measurement/memory unit (TMM). As a specific implementation, it is assumed that the parameter memory (PMM) and the time memory (TMM) are built on the external non-volatile memory (OFMEM) of FIG. 5, but as described above, the parameter memory (PMM) and the time memory (TMM) can also be included on the internal non-volatile memory (IFMEM) of the microprocessor (MPU). The time measurement unit is implemented by a real time clock (RTC) built in the microprocessor (MPU).

The data acquisition frequency information stored in the parameter memory (PMM) and the time information stored in the time measurement/memory unit (TMM) can also be set by the sensor terminal (NN) itself or from the base station via a communicator. In FIG. 11, there is illustrated an embodiment of setting from the base station (BS/WBS). The base station (BS/WBS) transmits a parameter (PMD) including the data acquisition frequency information to the sensor terminal (NN) via the communicator by communication management (BSCC). The sensor terminal (NN) temporarily places the received parameter information in a reception queue (RVQ), and then stores the received parameter information in the parameter memory (PMM).

For the time as well, the base station (BS/WBS) can manage its own time by the time management module (BSTB), and distribute that time to the sensor terminal (NN) to set the time. The sensor terminal (NN) stores the time information received from the base station (BS/WBS) in the time measurement/memory unit (TMM). The sensor terminal (NN) measures the time by using its own time measurement unit (RTC), and hence it is not required to frequently transfer time information from the base station (BS/WBS) to correct the time information of the sensor terminal.

The sensor terminal (NN) acquires measurement data from a plurality of mounted sensors (in the example of FIG. 11, sensor A, sensor B, and sensor C), and transmits the acquired measurement data to the base station (BS/WBS). In FIG. 11, there is illustrated a transmission flow directly from the sensors to the transmission key, but in general, as illustrated in FIG. 3, the measured data is temporarily stored in the non-volatile memory (OFMEM) as sensor data (SDT), and then transmitted. In order to simplify the illustration, in FIG. 11, storage in the non-volatile memory (OFMEM) is not shown.

The transmission data from the sensor terminal (NN) is stored in a transmission queue (TRQ), and then formed into packets and transmitted via a communicator. The transmission queue is used for temporarily storing a plurality of data when the transmission data cannot be transmitted immediately by the communicator. The transmission queue (TRQ) illustrated in FIG. 11 is an example of a circular-array type storage module (so-called ring buffer) having 10 stages (amount equal to 10 packets). Even when a transmission delay has occurred due to arbitration by the communicator or a deterioration in the radio wave state, up to 10 packets worth of data can be stored in the transmission queue (TRQ). When the communication state improves, the stored data can be continuously transmitted, enabling data loss to be prevented.

In FIG. 11, there is illustrated an example in which, in the transmission queue (TRQ), the measurement data from the sensor A is stored as SD11, SD12, SD13, and SD14, the measurement data from the sensor B is stored as SD21 and SD22, and the measurement data from the sensor C is stored as SD31. The reason why the number of pieces of data stored in the queue for each sensor is different is that the amount of data per unit time varies depending on the sensor type, and the setting for the data acquisition frequency stored in the parameter memory differs from sensor to sensor.

In FIG. 11, there is illustrated an example in which two parameters (first data group), namely, a PMD1 and a PMD2, are transmitted. The parameter information PMD1 and the parameter information PMD2 each include time information. The sensor data to be transmitted during the time indicated by each piece of time information is a slot corresponding to that time information. More specifically, the packet having a parameter 1 (PMD1) as a first data group and sensor measurement data SD11, SD21, SD12, SD31, and SD13 as a second data group is the first slot, and the packet having a parameter 2 (PMD2) as a first data group and the sensor measurement data SD14 and SD22 onward as a second data group is the second slot. In FIG. 11, the time-series key (TK) of the first slot is represented as a symbol beginning from TK0 (e.g., TK01 to TK03), and the time-series key of the second slot is represented as a symbol beginning from TK1 (e.g., TK11). Through setting in this way, the slot to which each packet belongs can be identified. The numerals at the end of the time-series keys represent the packet order of sensor data of the same type. The format of the time-series key (TK) is described in more detail later.

The base station (BS/WBS) that has received those packets via the communicator combines the data divided into packets by a data time-series restoration module (BSRC), reconstructs the data by using the time information and the parameters, and stores the reconstructs data in the sensor database (DSB).

In this way, even when the sensor terminal (NN) has fewer transmission queues (TRQ) than the number of sensors, a plurality of sensors can share one transmission queue (TRQ), and the storage area for the transmission queues (TRQ) can thus be reduced. The base station (BS/WBS) can rearrange and reconstruct the measurement data in order of acquisition time for each sensor based on the sensor type indicated by the sensor key, a sensing sequence number, and the packet number.

<Data Restoration Method>

Figure 12:
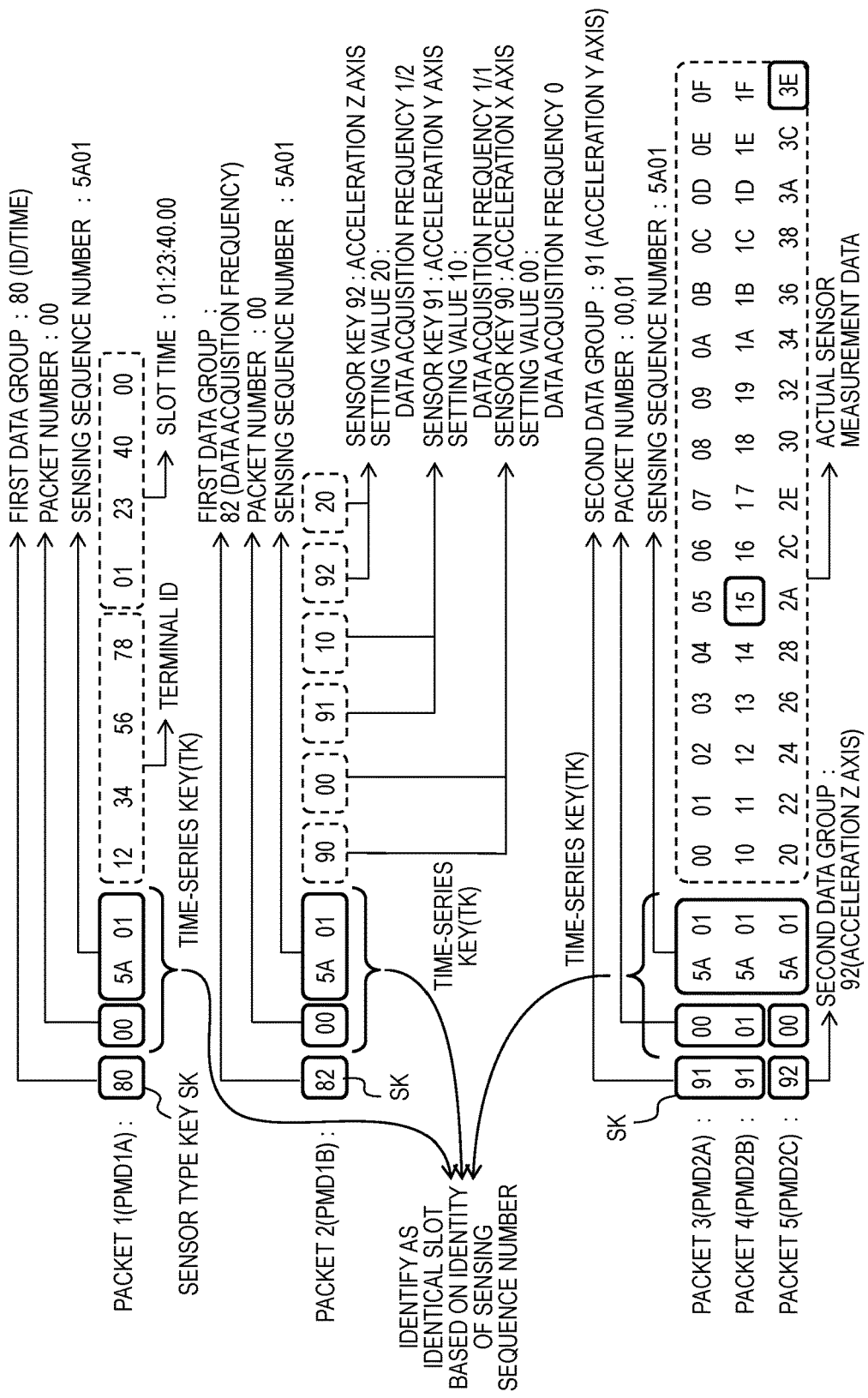
FIG. 12 is an explanatory diagram of a method of comparing packets by using the sensor type key and a time-series key in the embodiment of this invention.

FIG. 12 is an explanatory diagram of a method of comparing packets by using the sensor type key (SK) and the time-series key (TK) in the embodiment of this invention.

In FIG. 12, the packet 1 (PMD1A) and the packet 2 (PMD1B) are shown as the first data group, and a packet 3 (PMD2A), a packet 4 (PMD2B), and a packet 5 (PMD2C) are shown as the second data group that corresponds to the first data group and that is used for storing the actual data measured by the sensor. The first one byte of each packet is the sensor type key (SK), the following three bytes are the time-series key (TK), and the fifth byte onward are actual data.

The packet 1 (PMD1A) is a packet corresponding to the sensor type key value 0x80 of FIG. 9A, namely, a packet for transmitting a terminal ID and time information (time stamp). This type of packet is completed with only one packet, and hence the packet number is 0x00 and the sensing sequence number is 0x5A01. Specifically, this value represents the fact that the packet includes a parameter for the data stored in the packet indicated by the sensing sequence number 0x5A01 of the time-series key. In this example, the measurement start time of the slot having a terminal ID 0x12345678, which is four bytes, and a sensing sequence number 0x5A01 is 01:23:40.00.

This measurement start time is an example of a reference time for identifying the acquisition period of the measurement data included in the packet of the second data group corresponding to the packet 1 (PMD1A), but other time information can be used, as long as such time information is capable of identifying the acquisition period.

The packet 2 (PMD1B) is a packet corresponding to the sensor type key value 0x82 of FIG. 9A, namely, a packet for transmitting a data acquisition frequency. This type of packet is completed with only one packet, and hence the packet number is 0x00 and the sensing sequence number is 0x5A01, which is the same as that of the packet 1. Specifically, this value represents the fact that the packet includes a parameter for a packet that is in the same slot as that of the packet 1. In the example of FIG. 12, a parameter 0x00 is transmitted as the acquisition frequency setting value for the sensor type key 0x90 (acceleration X-axis), a parameter 0x01 is transmitted as the acquisition frequency setting value for the sensor type key 0x91 (acceleration Y-axis), and a parameter 0x20 is transmitted as the acquisition frequency setting value for the sensor type key 0x92 (acceleration Z-axis). Those parameters indicate that the sensor terminal (NN) does not transmit the measurement data of the acceleration X-axis, performs one transmission every time the data of the acceleration Y-axis is measured (i.e., transmits all the measured data), and performs one transmission every second time the data of the acceleration Z-axis is measured (i.e., thinned by ½), and the 0-th data, namely, an even numbered piece of data, is transmitted.

In this embodiment, the data acquisition frequency when transmitting data once every n-times of measuring the data is expressed as 1/n. In this case, n is also described as a thinning parameter. However, such a method of expressing the acquisition frequency is an example, and any expression method can be employed as long as the method is capable of identifying an acquisition interval of data to be transmitted to a base station among the data measured by each sensor. In the above-mentioned example, the measurement frequency of each sensor is fixed, and the sensor terminal thins the measurement data to 1/n in accordance with the set acquisition frequency for transmission. The base station is provided in advance with the original data measurement frequency of each sensor, which enables the acquisition interval of the received measurement data to be identified based on the thinning coefficient. In another example, the sensor terminal can transmit the acquisition interval of the measurement data to be transmitted or the number of times of acquisition per unit time. Each sensor can measure data at the same frequency as the set acquisition frequency in place of measuring data at a fixed measurement frequency.

The packet 3 (PMD2A) and the packet 4 (PMD2B) are packets corresponding to the sensor type key value 0x91 in FIG. 9B, namely, are packets in the second data group (actual sensor data) including the sensor data of the acceleration Y-axis for a period having the measurement start time of the slot as a start time. The sensing sequence number of the time-series key (TK) of those packets is 0x5A01, which is the same as those of the packets 1 and 2, indicating that the packets 3 and 4 include sensor measurement data corresponding to the same slot as those of the packets 1 and 2. However, the packet numbers at the time-series keys (TK) of the packets 3 and 4 are different, which are 0x00 and 0x01, respectively. This indicates that the packets 3 and 4 include different data acquired from the same sensor in the same slot. In this embodiment, the packet number is added by incrementing by 1 from 0x00. Therefore, the above-mentioned packet numbers indicate that the packets 3 and 4 include continuous data in terms of time of measurement values acquired from a sensor Y, and that measurement data stored in the packet 3 is acquired earlier than the measurement data stored in the packet 4.

The packet 5 (PMD2C) is a packet corresponding to the sensor type key value 0x92 in FIG. 9B, namely, is a packet in the second data group (actual sensor data) including the sensor data of the acceleration Z-axis for a period having the measurement start time of the slot as a start time. The sensing sequence number of the time-series key (TK) of those packets is 0x5A01, which is the same as those of the packets 1 to 4, indicating that the packet 5 includes sensor measurement data corresponding to the same slot as those of the packets 1 to 4. The packet number in the time-series key of the packet 5 is 0x00, which indicates that that packet number is a measurement data string of the first acceleration Z-axis of the slot indicated by 0x5A01.

As in the embodiment described above, in this invention, one time can be associated with a plurality of types of sensors and a plurality of packets based on a time-series key, which enables the total communication data amount to be reduced. Meanwhile, the time information at which the data was sensed is not added to all the packets, and hence in order to obtain the correct acquisition time of the data included in the packet, it is required to calculate the time by referring to each parameter.

For the data included in a given packet, when a slot time transmitted by the first data group is represented as T, a sampling interval of that sensor is represented as TS, the setting value of the data acquisition frequency is represented as TH, the number of pieces of stored data per packet is represented as PC, and the packet number in the time-series key of the packet is represented as TKPN, a measurement time TD of the N-th data of that packet is expressed by Expression (1).

$$TD = T + (TKPN \times PC + N - 1) \times TH \times TS \quad (1)$$

In the embodiment illustrated in FIG. 12, assuming that the sampling interval TS of the acceleration data is 0.05 second (50 milliseconds), for example, the sixth piece of data (15) of the packet 4 can be reconstructed as being the acceleration Y-axis data acquired at the time 01:23:41:05 calculated by Expression (2), and the sixteenth piece of data (3E) of the packet 5 can be reconstructed as being the acceleration Z-axis data acquired at the time 01:23:41:50 calculated by Expression (3).

$$01:23:41:05 = 01:23:40:00 + (01 \times 16 + 6 - 1) \times 01 \times 0.05 \quad (2)$$

$$01:23:41:50 = 01:23:40:00 + (00 \times 16 + 16 - 1) \times 02 \times 0.05 \quad (3)$$

<Order Guarantee and Loss Detection>

Figure 13:
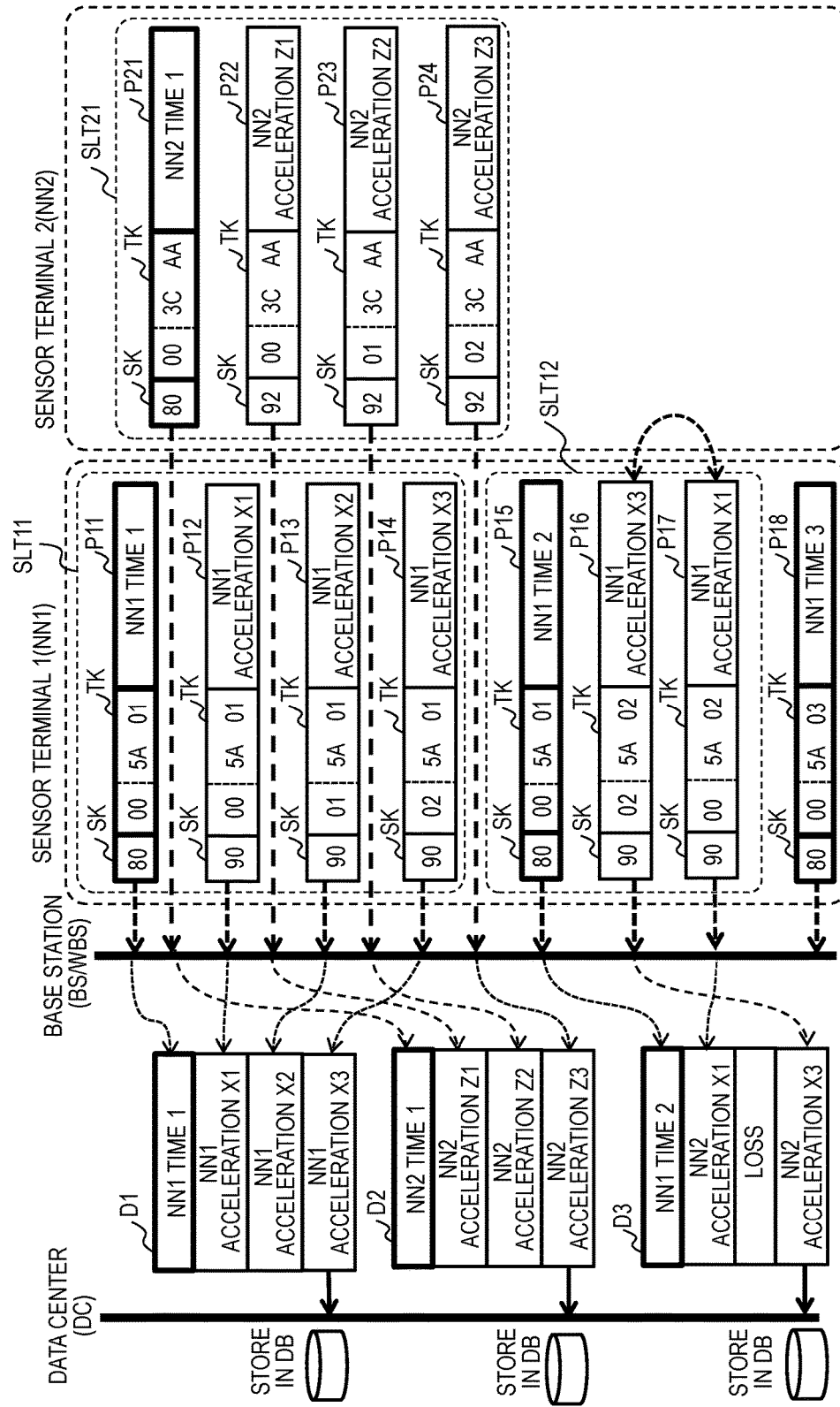
FIG. 13 is an explanatory diagram of operation of a base station that receives data from a plurality of sensor terminals in the embodiment of this invention.

FIG. 13 is an explanatory diagram of operation of a base station (BS/WBS) that receives data from a plurality of sensor terminals in the embodiment of this invention.

In FIG. 13, two sensor terminals, namely, the sensor terminal 1 (NN1) and the sensor terminal 2 (NN2), transmit sensor measurement data of the acceleration X-axis having the sensor type key (SK) 0x90 and the acceleration Z-axis having the sensor type key (SK) 0x92, respectively. The sensor terminal 1 (NN1) transmits the data of the slot 1 (SLT11), and then the sensor terminal 2 (NN2) transmits the data of the slot 2 (SLT21) at almost the same time. The base station (BS/WBS) receives a time information packet (P11) having the sensing sequence number 0x5A01 from the sensor terminal 1 (NN1), and then receives a time information packet (P21) having the sensing sequence number 0x3CAA from the sensor terminal 2 (NN2).

The base station (BS/WBS) receives packets P12, P13, and P14 of the acceleration data X having the sensing sequence number 0x5A01 from the sensor terminal 1 (NN1), and packets P22, P23, and P24 of acceleration data Z having the sensing sequence number 0x3CAA from the sensor terminal 2 (NN2). In the example of FIG. 13, the base station (BS/WBS) receives those packets in the order of P12, P22, P13, P23, P14, and P24.

As described above, the base station (BS/WBS) refers to the sensing sequence number (TKSN) of the time-series key (TK) from a packet group in which packets transmitted from a plurality of sensor terminals coexist, combines the pieces of sensor data included in the packets transmitted from the same sensor terminal to reconstruct sensor data D1 and D2, and stores the reconstructed sensor data D1 and D2 in the DB of the data center.

The packet numbers (TKPN) of the time-series keys of the three packets P12, P13, and P14 of the acceleration data X included in the slot 1 (SLT11) from the sensor terminal 1 (NN1) and the three packets P22, P23, and P24 of the acceleration data Z (SLT21) included in the slot 2 (SLT21) from the sensor terminal 2 (NN2) are all in the proper order of 0x00, 0x01, and 0x02, respectively, and hence it can be understood that the base station (BS/WBS) has received those packets without any loss.

Meanwhile, in the slot 2 (SLT12) having the sensing sequence number 0x5A02 from the sensor terminal 1 (NN1), there are no packets having the packet number (TKPN) 0x01 due to, for example, a failure in the communication path. A packet having the packet number 0x02 and a packet having the packet number 0x00 (P16 and P17, respectively) are received in that order, and then the packet P18 of the next slot is received. When combining the sensor data by referring to the sensing sequence number (TKSN) of the time-series key (TK), the base station (BS/WBS) can refer to the packet number (TKPN), detect lost packets and incorrect packet reception order based on continuity analysis, rearrange the data and supplement lost data to reconstruct the data, and store the reconstructed data in the database of the data center as sensor data D3.

In the example of FIG. 13, it can be understood from the packet numbers (TKPN) that the packet P17 received after the previously received packet P16 includes measurement data acquired earlier than the packet P16, and that one packet that should be between packets P16 and P17 has been lost. Therefore, in the sensor database, NN2 acceleration X1 extracted from the packet P17 and NN2 acceleration X3 extracted from the packet P16 are stored in that order, and a free space for one packet is secured between them.

<Method of Decreasing Transmission Frequency by Detecting Communication Loss>

As described above, in this invention, mixed/dispersed packets are combined based on the sensing sequence number (TKSN) included in the time-series key (TK), and lost packets are detected and an incorrect reception order is corrected based on the continuity of the packet numbers (TKPN). In general, particularly in wireless-based data collection that is required to be carried out in real time, when there are a larger number of sensor terminals transmitting data to the base station, the communication band of the communication path becomes tight, and the number of packets that are lost due to increased congestion increases.

Figure 14A:
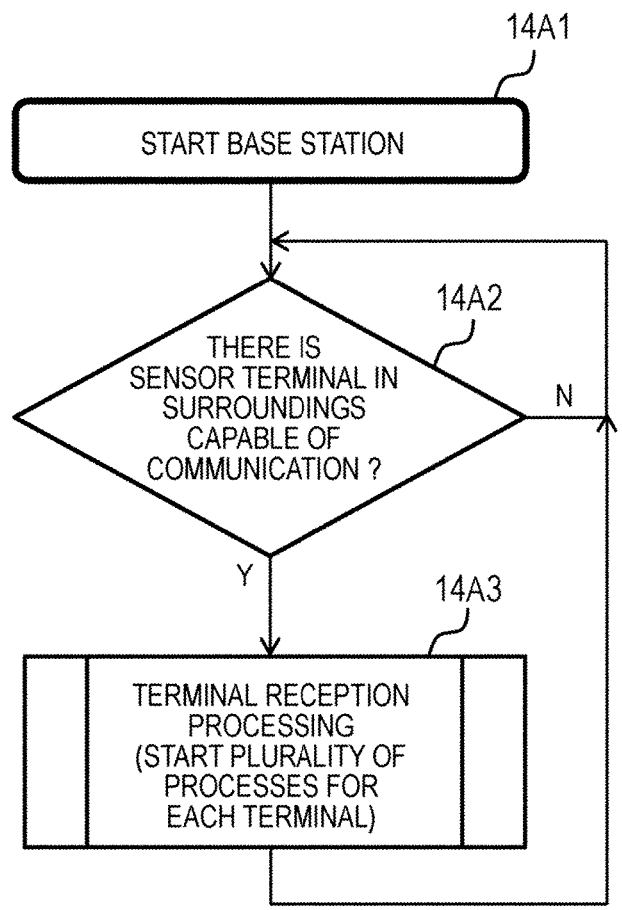
FIG. 14A, FIG. 14B, and FIG. 14C are flowcharts for illustrating an operation by the base station in the embodiment of this invention for detecting packet loss and controlling a data acquisition frequency.
Figure 14B:
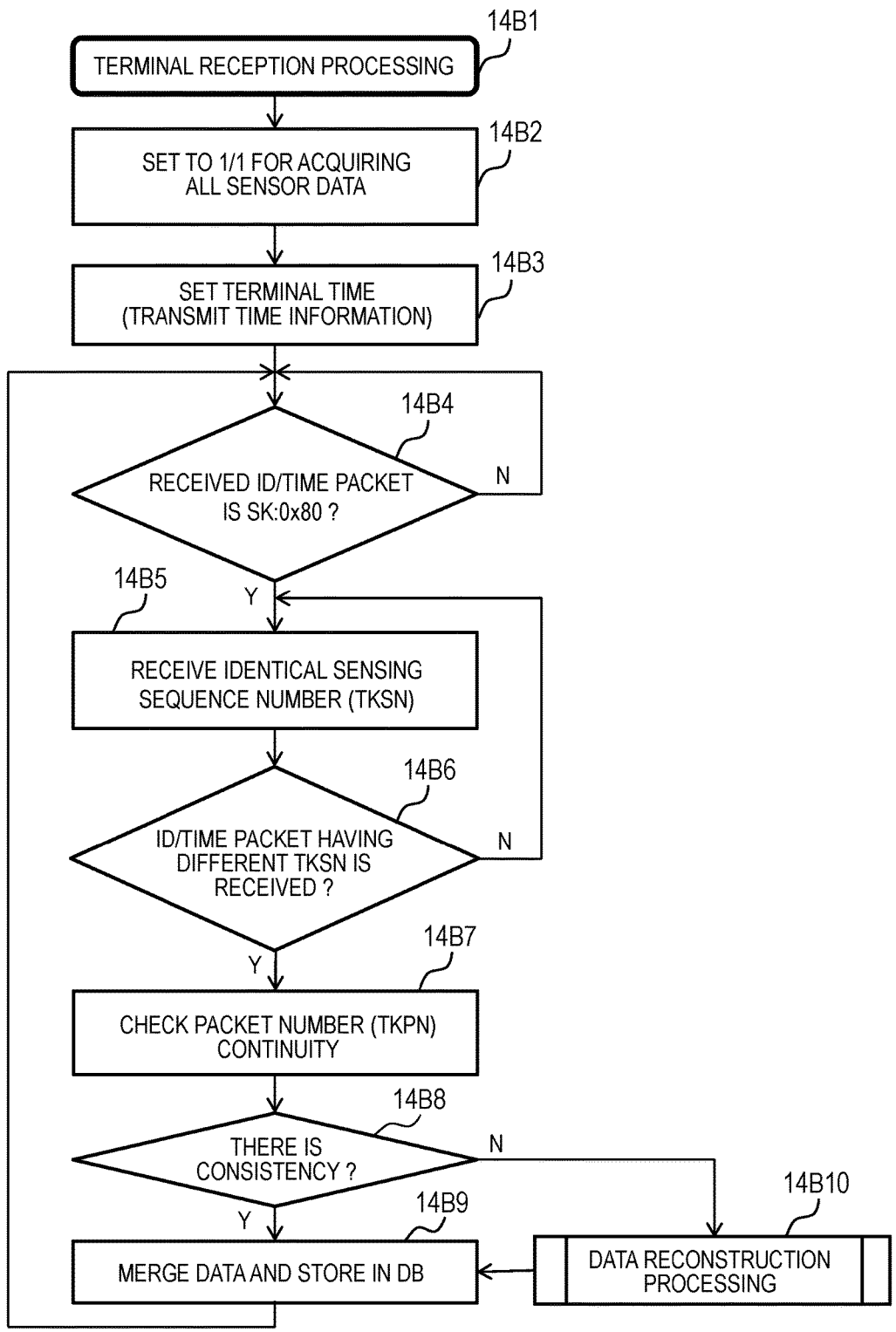
Figure 14C:
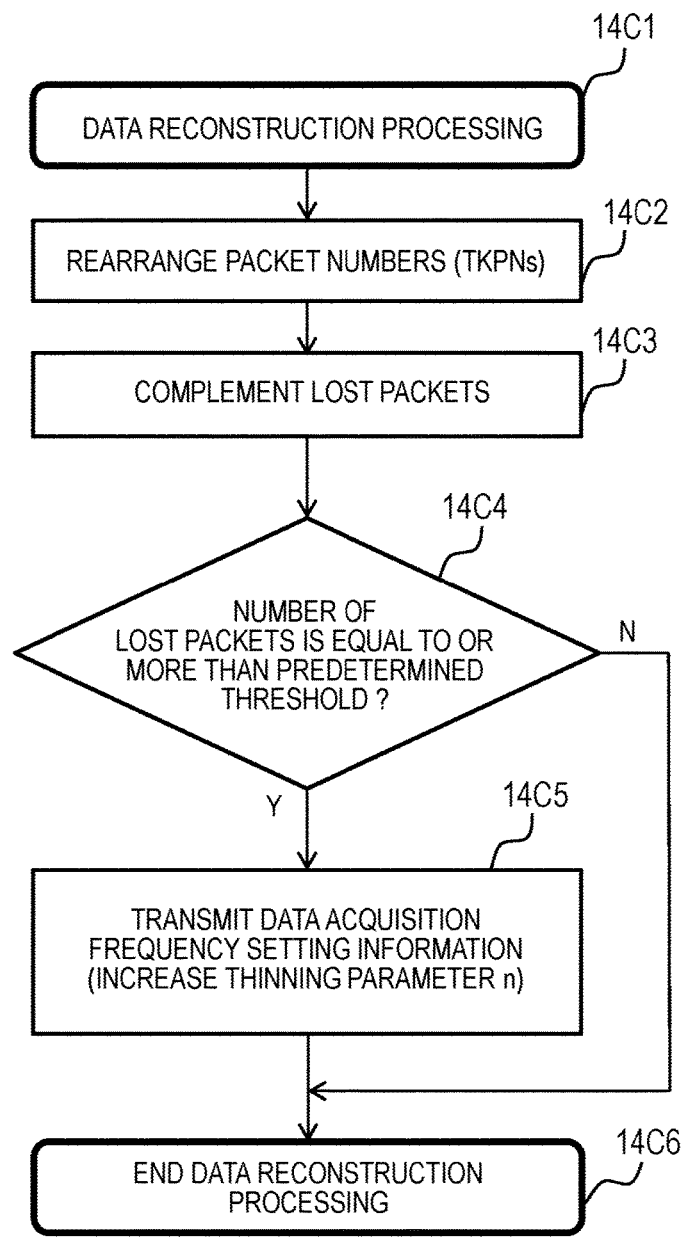

FIG. 14A, FIG. 14B, and FIG. 14C are flowcharts for illustrating an operation by the base station in the embodiment of this invention for detecting packet loss and controlling the data acquisition frequency.

In FIG. 14A, there is illustrated processing of starting the base station (BS/WBS). When the base station (BS/WBS) starts (Step 14A1), the base station (BS/WBS) detects whether there is a sensor terminal (NN) in the surroundings capable of communication (Step 14A2). The detection method depends on the communication method, but in the case of Bluetooth, for example, detection is performed by receiving a detection request (advertisement) packet from the sensor terminal. When there is a sensor terminal capable of communication, the base station (BS/WBS) performs data reception processing from the terminal (NN). In general, the base station (BS/WBS) communicates to/from a plurality of sensor terminals (NN), but in this example, there is described a case in which the base station (BS/WBS) communicates to/from one sensor terminal (NN). When the base station (BS/WBS) communicates to/from a plurality of sensor terminals (NN), the terminal reception processing in this embodiment is performed in parallel. Specifically, the base station (BS/WBS) starts the terminal reception processing illustrated in FIG. 14B as a plurality of processes corresponding to the number of terminals (NN) (Step 14A3).

In FIG. 14B, there is illustrated terminal reception processing. In the terminal reception processing (Step 14B1), the base station (BS/WBS) first sets an initial value of a parameter of the sensor terminal (NN). In this embodiment, the base station (BS/WBS) sets a parameter for the sensor data acquisition frequency to a 1/1 setting for acquiring all the sensor data (Step 14B2). This is carried out by the base station (BS/WBS) transmitting the setting values to the sensor terminal (NN).

Next, the base station (BS/WBS) transmits time information for setting the time of the sensor terminal (NN) (Step 14B3). The sensor terminal (NN) starts the sensing operation by setting the time. In the case of implementing measurement by the sensors on the sensor terminal and transmitting data, the sensor terminal (NN) first transmits a parameter, for example, an ID/time packet (sensor type key SK value: 0x80), as the first data group. When the base station (BS/WBS) receives this parameter, the base station (BS/WBS) recognizes data transmission from the sensor terminal (NN) (Step 14B4).

Then, the base station (BS/WBS) receives data of the same slot as that of the first data group based on the identity between the sensing sequence number (TKSN) of the time-series key (TK) included in the packet of the first data group and the sensing sequence number (TKSN) of the time-series key (TK) included in the packet of the second data group in which the actual sensor measurement data is stored (Step 14B5).

When the base station (BS/WBS) has received an ID/time packet having a sensing sequence number (TKSN) different from those of previously received ID/time packets (Step 14B6), the base station (BS/WBS) recognizes that the received ID/time packet is data from a different slot, combines that ID/time packet with the data received so far, and stores the combined data in the database. First, the base station (BS/WBS) checks the continuity (Step 14B7) and checks the consistency (Step 14B8) of the packet numbers (TKPN) of the time-series key (TK) added to the received second data group. When the packet numbers (TKPN) are consistent (i.e., there is no discontinuity in the packet numbers (TKPN) and the order of those packet numbers matches the reception order of the packets), it is determined that the data is correct, and hence the data is combined and stored in the database (DSB) (Step 14B9). At this time, for example, the acquisition time of each measurement data is identified by the method shown in Expressions (1) to (3).

When correct data has been received, the base station (BS/WBS) then receives the next packet (Step 14B4).

When there is an abnormality in the consistency of the packet numbers (TKPN) of the time-series key (TK), this means that the data reception order is incorrect or that data has been lost. In this case, the base station (BS/WBS) performs data reconstruction processing (Step 14B10). Then, the base station (BS/WBS) combines and stores the reconstructed data in the database (DSB) (Step 14B9).

In FIG. 14C, there is illustrated data reconstruction processing. In the data reconstruction processing (Step 14C1), first, in order to identify the acquisition order of the measurement data included in the received packets, the base station (BS/WBS) first rearranges (i.e., changes the order of) the packets in order of packet number (TKPN) (Step 14C2). When the packet numbers (TKPN) of the rearranged packets are not consecutive, this means that the missing packets have been lost in the course of communication. The base station (BS/WBS) performs, as necessary, processing of supplementing the packets determined to be lost (Step 14C3). When the amount of measurement data included in each packet is predetermined, the acquisition time of each measurement data included in the packet (P16 in the example of FIG. 13) following the lost packet can be identified, based on the number of lost packets and the amount of measurement data that should have been included in the packets, by using Expressions (1) to (3).

Depending on the application, when the number of lost packets is equal to or more than a certain amount, operation may be hindered. Therefore, in this embodiment, congestion of the communication path is reduced and data loss is prevented by adjusting the acquisition frequency of data and selectively acquiring data having a high priority.

For example, when the number of lost packets per unit time (i.e., the frequency of lost packets) is equal to or more than a threshold defined in advance (Step 14C4), the base station (BS/WBS) changes a thinning parameter n by changing the data acquisition frequency of the data, and setting the new setting in the terminal (NN) (Step 14C5). Specifically, by increasing the thinning parameter n, the data acquisition frequency decreases, and hence the amount of data transmitted from the sensor terminal (NN) to the base station (BS/WBS) decreases, and congestion of the communication path is reduced. The base station (BS/WBS) transmits, as an instruction for changing the data acquisition frequency setting, information from which the data acquisition frequency after the change can be identified to the sensor terminal (NN). For example, the thinning parameter n may be transmitted, or the acquisition frequency itself (e.g., a value of 1/n or the number of times of acquisition per unit time) may be transmitted.

After the above-mentioned steps, the data reconstruction processing is completed (Step 14C6).

Figure 15:
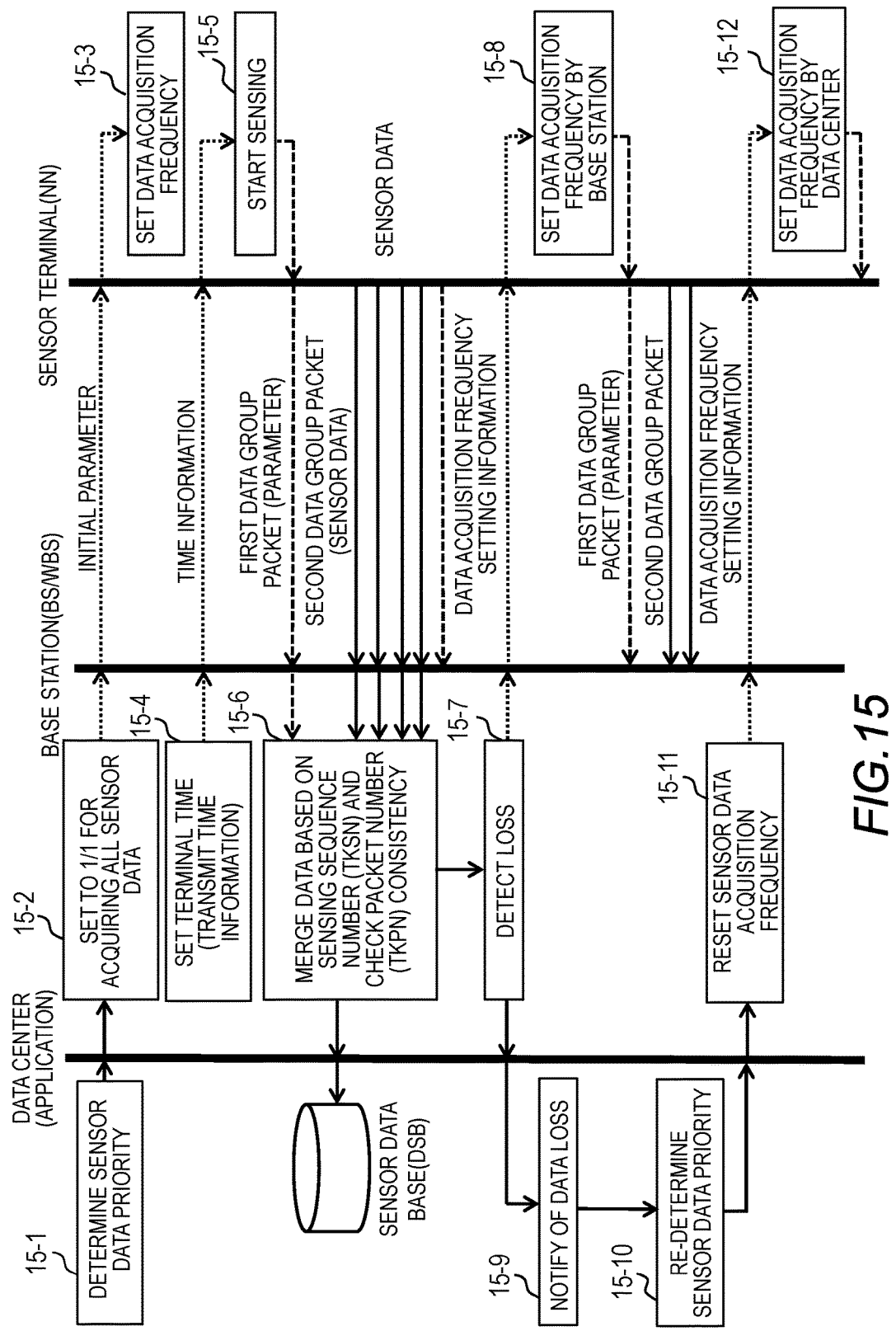
FIG. 15 is a flowchart for illustrating processing of setting the data acquisition frequency in the sensor terminal, the base station, and a data center in the embodiment of this invention.

FIG. 15 is a flowchart for illustrating processing of setting the data acquisition frequency in the sensor terminal, the base station, and the data center (application) in the embodiment of this invention.

In the terminal reception processing, the initial value for a sensor terminal (NN) parameter is set (Step 15-2). In this embodiment, the parameter for the sensor data acquisition frequency is set to 1/1 for acquiring all the sensor data. This setting is performed by the base station (BS/WBS) transmitting the setting value to the sensor terminal (NN) (Step 15-3). The initial value of the parameter may be an initial value set in advance in the base station (BS/WBS), or may be a value based on the sensor data priority (Step 15-1) determined by an application in the data center.

Next, the base station (BS/WBS) transmits the time information for setting the time of the sensor terminal (NN) (Step 15-4). The sensor terminal (NN) starts the sensing operation when the time has been set (Step 15-5). When the sensor terminal (NN) implements measurement by the sensors and transmits data, first, the sensor terminal (NN) transmits a parameter, for example, an ID/time packet, as the first data group. When the base station (BS/WBS) receives this parameter, the base station (BS/WBS) recognizes data transmission from the sensor terminal (NN). The base station (BS/WBS) combines the data based on the received first data group and the time-series key (TK) included in the second data group, and stores the combined data in the database (Step 15-6).

When the loss of a certain number of packets or more is detected by the consistency check of the packet number (TKPN) (Step 15-7), the base station (BS/WBS) transmits the data acquisition frequency setting value to the sensor terminal (NN), and adjusts the data amount of the communication path. Resetting of the data acquisition frequency of the sensor terminal (NN) may be performed autonomously by the base station (BS/WBS), or may be performed by the application re-determining the priority based on the required data. When the application is to perform this determination, the base station (BS/WBS) issues a data loss notification to the application of the data center (Step 15-9), and the application re-determines the priority of the sensor data (Step 15-10). The base station (BS/WBS) re-sets the acquisition frequency of the sensor data based on the priority determined by the application (Step 15-11), and transmits the data acquisition frequency setting information to the sensor terminal (NN). The sensor terminal (NN) sets the data acquisition frequency in accordance with the received data acquisition frequency setting information (Step 15-12).

When the priority is set for each sensor terminal (NN) or each sensor, the base station (BS/WBS) can reset the data acquisition frequency based on that priority. For example, when the packet loss frequency from a plurality of sensor terminals (NN) is the same, the data acquisition frequency of the sensor terminal (NN) having the lowest priority among those sensor terminals (NN) can be preferentially decreased. Similarly, when the priority is set for each sensor, the data acquisition frequency of the sensor having the lowest priority can be preferentially decreased. As a result, it is possible to prevent loss of measurement data for an important sensor terminal (NN) or sensor.

According to the embodiment of this invention described above, through transmission of communication packets by dividing the packets into communication packets storing a first data group including time information, a sensor data acquisition frequency, and the like, and communication packets storing a second data group including the actual data measured by the sensors, the amount of data per communication packet can be reduced, and communication efficiency can be improved, and as a result, congestion on the communication path can be prevented. Further, through setting of the interval for transmitting the first data group to be longer than the interval for transmitting the second data group (i.e., increasing the number of packets of the second data group as compared with the number of packets of the first data group), the total communication data amount can be reduced. At this time, the continuity and the order relationship of the data can be guaranteed. In addition, through provision of means for changing the transmission interval of the measurement data acquired by the sensors from the base station, the total amount of communication data can be reduced.

This invention is not limited to the embodiments described above, and encompasses various modification examples. For example, the embodiments have been described in detail for easier understanding of this invention, and this invention is not necessarily limited to a mode that includes all of the configurations described above. A part of the configuration of one embodiment may be replaced with the configuration of another embodiment, and the configuration of one embodiment may be used in combination with the configuration of another embodiment. In each embodiment, another configuration may be added to, deleted from, or replace a part of the configuration of the embodiment.

The components, functions, processing modules, processing measures, and the like described above may be implemented partially or entirely by hardware by, for example, designing the components and the like as an integrated circuit. The components, functions, and the like described above may also be implemented by software by interpreting and executing, with a processor, programs that implement the respective functions. The programs, tables, files, and other types of information for implementing the functions can be stored in a computer-readable non-transitory data storage medium such as a non-volatile semiconductor memory, or a hard disk drive, a solid state drive (SSD), or other storage device, or an IC card, an SD card, a DVD, or the like.

Further, the control lines and information lines considered to be required for the description are illustrated. It is not necessarily the case that all the control lines and information lines required for a product are illustrated. In actual practice, almost all the configurations may be considered as being connected to each other.

What is claimed is:

1. A sensor system, comprising:
a terminal apparatus comprising a sensor; and
a base station configured to communicate to/from the terminal apparatus,
the terminal apparatus being configured to:
store, of measurement data acquired by the sensor, an acquisition frequency for the measurement data to be transmitted to the base station; and
transmit first data including the acquisition frequency and a reference time of an acquisition period in which the measurement data is acquired by the sensor, and second data corresponding to the first data and including a plurality of pieces of measurement data acquired by the sensor at the acquisition frequency during the acquisition period,
the base station being configured to identify, based on the reference time and the acquisition frequency included in the first data, an acquisition time of each of the plurality of pieces of measurement data included in the second data corresponding to the first data,
wherein the terminal apparatus is configured to include the first data in at least one first packet to transmit the first data, and to include the second data in a plurality of second packets to transmit the second data, a number of the plurality of second packets being larger than a number of at least one first packet,
wherein the terminal apparatus is configured to:
assign the same identification information to the at least one first packet including the first data and to the plurality of second packets including the second data corresponding to the first data; and
assign to each of the plurality of second packets a packet number representing an acquisition order of the measurement data included in the each of the plurality of second packets, and
wherein the base station is configured to:
identify, based on the packet number, an acquisition order of the measurement data included in the plurality of second packets to which the same identification information has been assigned;
determine, based on the packet number, a presence or absence of loss of the measurement data; and
identify an acquisition time of each piece of measurement data based on the reference time and the acquisition frequency included in the at least one first packet to which the same identification information as the identification information assigned to the plurality of second packets has been assigned, the identified acquisition order of the measurement data, and a result of the determination of the presence or absence of loss of the measurement data,
wherein the terminal apparatus further comprises:
a plurality of sensors; and
circular-array type storage modules, a number of circular-array type storage modules being less than a number of the plurality of sensors,
wherein the terminal apparatus is configured to:
store, in one of the circular-array type storage modules, for each amount to be stored in one packet, measurement data acquired by at least two sensors of the plurality of sensors; and
generate and transmit the second packet including measurement data sequentially read from the circular-array type storage modules, identification information on the at least two sensors from which the measurement data has been acquired, and the packet number, and
wherein the base station is configured to identify, based on the identification information on the at least two sensors, the acquisition order of the measurement data for each of the at least two sensors which acquire the measurement data.

2. The sensor system according to claim 1,
wherein the base station is configured to transmit information instructing the acquisition frequency to the terminal apparatus, and
wherein the terminal apparatus is configured to store the acquisition frequency instructed by the information received from the base station.

3. The sensor system according to claim 2, wherein the base station is configured to transmit, when a frequency of loss of the measurement data is larger than a predetermined value, to the terminal apparatus information instructing the acquisition frequency to be decreased.

4. A method of collecting data, which is executed by a sensor system,
the sensor system comprising:
a terminal apparatus comprising a sensor; and
a base station configured to communicate to/from the terminal apparatus,
the terminal apparatus being configured to store, of measurement data acquired by the sensor, an acquisition frequency for the measurement data to be transmitted to the base station,
the method comprising:
a first step of receiving, by the base station, from the terminal apparatus, first data including the acquisition frequency and a reference time of an acquisition period in which the measurement data is acquired by the sensor, and second data corresponding to the first data and including a plurality of pieces of measurement data of the sensor acquired at the acquisition frequency during the acquisition period; and a second step of identifying, by the base station, based on the reference time and the acquisition frequency included in the first data, an acquisition time of each of the plurality of pieces of measurement data included in the second data corresponding to the first data, the method further comprising including the first data in at least one first packet to transmit the first data, and including the second data in a plurality of second packets to transmit the second data, a number of the plurality of second packets being larger than a number of at least one first packet, wherein the same identification information is assigned to the at least one first packet including the first data and to the plurality of second packets including the second data corresponding to the first data, wherein each of the plurality of second packets includes a packet number representing an acquisition order of the measurement data included in the each of the plurality of second packets, wherein the second step comprises:

identifying, by the base station, based on the packet number, an acquisition order of the measurement data included in the plurality of second packets to which the same identification information has been assigned;

determining, by the base station, based on the packet number, a presence or absence of loss of the measurement data; and identifying, by the base station, an acquisition time of each piece of measurement data based on the reference time and the acquisition frequency included in the at least one first packet to which the same identification information as the identification information assigned to the plurality of second packets has been assigned, the identified acquisition order of the measurement data, and a result of the determination of the presence or absence of loss of the measurement data, and wherein the terminal apparatus comprises:

a plurality of sensors; and circular-array type storage modules, a number of circular-array type storage modules being less than a number of the plurality of sensors, wherein the method further comprises:

storing, by the terminal apparatus, in one of the circular-array type storage modules, for each amount to be stored in one packet, measurement data acquired by at least two sensors of the plurality of sensors; and generating and transmitting the second packet including measurement data sequentially read from the circular-array type storage modules, identification information on the at least two sensors from which the measurement data has been acquired, and the packet number, and wherein the second step further comprises identifying, by the base station, based on the identification information on the at least two sensors, the acquisition order of the measurement data for each of the at least two sensors which acquire the measurement data.

5. The method of collecting data according to claim 4, further comprising a third step of transmitting, by the base station, information instructing the acquisition frequency to the terminal apparatus, and storing, by the terminal apparatus, the acquisition frequency instructed by the information received from the base station.

6. The method of collecting data according to claim 5, wherein the third step comprises transmitting, by the base station, when a frequency of loss of the measurement data is larger than a predetermined value, to the terminal apparatus information instructing the acquisition frequency to be decreased.

* * * * *